US011172533B2

(12) United States Patent
Kong et al.

(10) Patent No.: US 11,172,533 B2
(45) Date of Patent: Nov. 9, 2021

(54) METHODS AND APPARATUS TO FACILITATE MULTI-TASKING AND SMART LOCATION SELECTION DURING CONNECTED-MODE DISCONTINUOUS RECEPTION MODE

(71) Applicant: QUALCOMM Incorporated, San Diego, CA (US)

(72) Inventors: Ting Kong, San Diego, CA (US); Jafar Mohseni, San Diego, CA (US); Zae Yong Choi, San Jose, CA (US); Yongle Wu, San Diego, CA (US); Raghu Narayan Challa, San Diego, CA (US); Alexei Yurievitch Gorokhov, San Diego, CA (US); Yong Li, San Diego, CA (US)

(73) Assignee: QUALCOMM Incorporated, San Diego, CA (US)

( * ) Notice: Subject to any disclaimer, the term of this patent is extended or adjusted under 35 U.S.C. 154(b) by 0 days.

(21) Appl. No.: 16/556,091

(22) Filed: Aug. 29, 2019

(65) Prior Publication Data

US 2021/0068193 A1 Mar. 4, 2021

(51) Int. Cl.
*H04W 52/02* (2009.01)
*H04W 76/28* (2018.01)
(Continued)

(52) U.S. Cl.
CPC .......... *H04W 76/28* (2018.02); *H04B 7/0617* (2013.01); *H04W 24/10* (2013.01); *H04W 52/0229* (2013.01); *H04W 52/0264* (2013.01)

(58) Field of Classification Search
CPC ....... H04W 4/70; H04W 24/10; H04W 52/00; H04W 52/0203; H04W 52/0209;
(Continued)

(56) References Cited

U.S. PATENT DOCUMENTS

2018/0132186 A1 5/2018 Kumar et al.
2019/0052379 A1* 2/2019 Lin .................. H04L 5/0082
(Continued)

FOREIGN PATENT DOCUMENTS

WO WO-2015065029 A1 5/2015
WO WO-2017134561 A1 8/2017

OTHER PUBLICATIONS

LG Electronics, SS block based RRM measurement, 3GPP TSG RAN WG1 Meeting #90, R1-1713132, 5 pages, Aug. 2017.*
(Continued)

*Primary Examiner* — Frank Duong
(74) *Attorney, Agent, or Firm* — Procopio, Cory, Hargreaves & Savitch LLP

(57) ABSTRACT

Apparatus, methods, and computer-readable media for facilitating multi-tasking and smart location selection during connected-mode discontinuous reception (CDRX) mode are disclosed herein. Example techniques disclosed herein enable a UE to perform multiple tasks during a same SSBS to reduce the number of wake-up SSBSs. For example, disclosed techniques enable a UE to perform RLM tasks and loop tracking tasks during a first SSBS and thereby reduce the number of wake-up SSBSs. In some examples, the UE may also perform the search task or the measurement task during the same first SSBS and, thereby, further reduce the number of wake-up SSBSs. Example techniques disclosed herein may also enable the UE to select which SSBS occurrences to wake-up for during the OFF duration of the CDRX cycle.

32 Claims, 16 Drawing Sheets

(51) Int. Cl.
*H04B 7/06* (2006.01)
*H04W 24/10* (2009.01)

(58) Field of Classification Search
CPC ......... H04W 52/0216; H04W 52/0229; H04W 52/0235; H04W 52/0264; H04W 56/0015; H04W 68/02; H04W 76/27; H04W 76/28; H04W 84/12; H04W 88/06; H04B 7/0617; Y02D 30/70
See application file for complete search history.

(56) References Cited

U.S. PATENT DOCUMENTS

| | | | | |
|---|---|---|---|---|
| 2019/0297577 A1* | 9/2019 | Lin | .................. | H04W 52/0219 |
| 2019/0342801 A1* | 11/2019 | Cui | .................. | H04W 36/0088 |
| 2019/0349797 A1* | 11/2019 | Lin | ...................... | H04W 48/16 |
| 2019/0393980 A1* | 12/2019 | Lin | ........................ | C12P 5/023 |
| 2020/0229093 A1* | 7/2020 | Ahmad | ............. | H04W 52/0209 |
| 2020/0413276 A1* | 12/2020 | Zhu | ...................... | H04W 24/10 |

OTHER PUBLICATIONS

ZTE, Radio Link Monitoring in NR, 3GPP TSG RAN WG1 Meeting #90, R1-1712070, 6 pages, Aug. 2017.*
International Search Report and Written Opinion—PCT/US2020/046900—ISA/EPO—dated Jan. 18, 2021.
Mediatek Inc: "Evaluation Methodology for NR UE Power Saving Study", 3GPP Draft, 3GPP TSG RAN WG1 Meeting #94bis, R1-1810447_Evaluation Methodology for NR UE Power Saving Study Final, 3rd Generation Partnership Project (3GPP), Mobile Competence Centre, 650, Route Des Lucioles, F-06921 Sophia-Antipol, vol. RAN WG1, No. Chengdu, China, Oct. 8, 2018- Oct. 12, 2018, Sep. 29, 2018 (Sep. 29, 2018), XP051517856, 13 Pages, Retrieved from the Internet: URL:http://www.3gpp.org/ftp/tsg%5Fran/WG1%5FRL1/TSGR1%5F94b/Docs/R1%2D1810447%2Ezip [retrieved on Sep. 29, 2018] Appendix B.

* cited by examiner

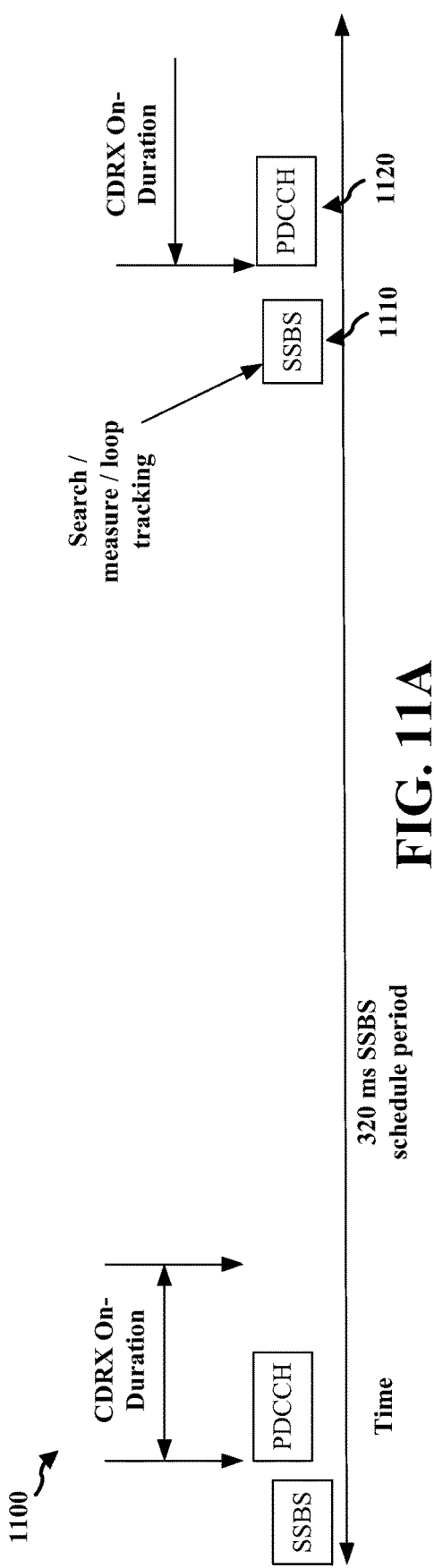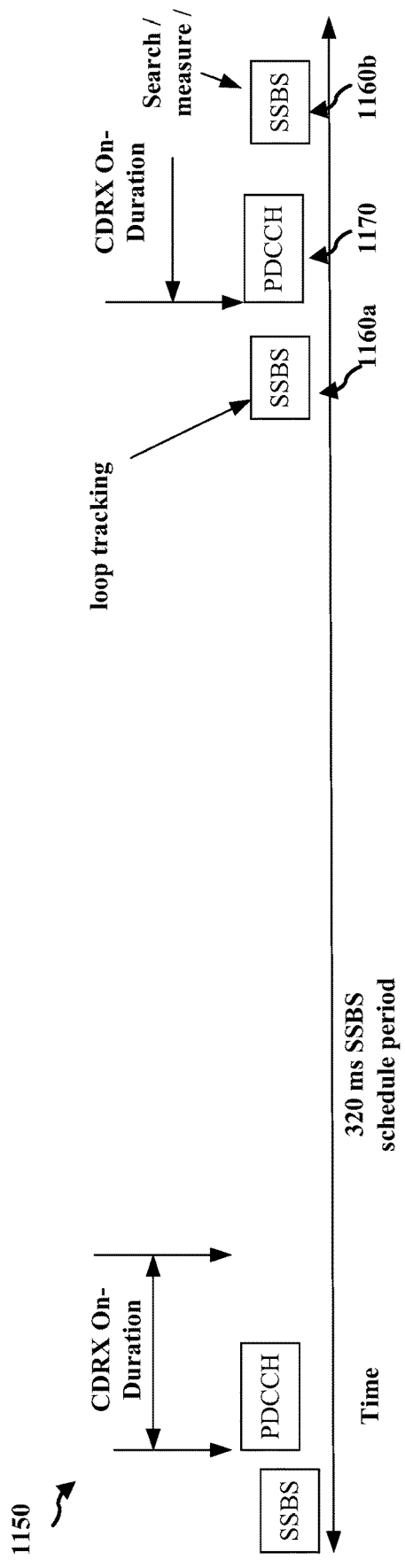
FIG. 11A
FIG. 11B

METHODS AND APPARATUS TO FACILITATE MULTI-TASKING AND SMART LOCATION SELECTION DURING CONNECTED-MODE DISCONTINUOUS RECEPTION MODE

BACKGROUND

Technical Field

The present disclosure relates generally to communication systems, and more particularly, to wireless communication including a discontinuous reception mode.

Introduction

Wireless communication systems are widely deployed to provide various telecommunication services such as telephony, video, data, messaging, and broadcasts. Typical wireless communication systems may employ multiple-access technologies capable of supporting communication with multiple users by sharing available system resources. Examples of such multiple-access technologies include code division multiple access (CDMA) systems, time division multiple access (TDMA) systems, frequency division multiple access (FDMA) systems, orthogonal frequency division multiple access (OFDMA) systems, single-carrier frequency division multiple access (SC-FDMA) systems, and time division synchronous code division multiple access (TD-SCDMA) systems.

These multiple access technologies have been adopted in various telecommunication standards to provide a common protocol that enables different wireless devices to communicate on a municipal, national, regional, and even global level. An example telecommunication standard is 5G New Radio (NR). 5G/NR is part of a continuous mobile broadband evolution promulgated by Third Generation Partnership Project (3GPP) to meet new requirements associated with latency, reliability, security, scalability (e.g., with Internet of Things (IoT)), and other requirements. 5G/NR includes services associated with enhanced mobile broadband (eMBB), massive machine type communications (mMTC), and ultra reliable low latency communications (URLLC). Some aspects of 5G/NR may be based on the 4G Long Term Evolution (LTE) standard. There exists a need for further improvements in 5G/NR technology. These improvements may also be applicable to other multi-access technologies and the telecommunication standards that employ these technologies.

SUMMARY

The following presents a simplified summary of one or more aspects in order to provide a basic understanding of such aspects. This summary is not an extensive overview of all contemplated aspects, and is intended to neither identify key or critical elements of all aspects nor delineate the scope of any or all aspects. Its sole purpose is to present some concepts of one or more aspects in a simplified form as a prelude to the more detailed description that is presented later.

At times, a user equipment (UE) may operate in accordance with a connected-mode discontinuous reception (CDRX) cycle to conserve power. When operating in accordance with the CDRX cycle, the UE may wake-up and actively communicate with a network device, such as a base station, during an ON duration of the CDRX cycle. The UE may then enter a sleep state during an OFF duration of the CDRX cycle. When the UE operates in the OFF duration, a main modem of the UE may be operated at a lower power level or turned off, and loops of the UE (e.g., automatic gain control (AGC) loops, time tracking loops (TTLs), frequency tracking loops (FTLs), power delay profile (PDP) loops, and/or channel estimation loops) may lose synchronization.

Synchronization signals, including synchronization signal blocks (SSBs) and synchronization signal burst sets (SSBSs), are reference signals that may be periodically transmitted by the network and received by the UE. In some examples, the UE may use the synchronization signals received during the OFF duration of a CDRX cycle to perform one or more tasks in preparation for the upcoming ON duration of the CDRX cycle. For example, during an SSBS, the UE may perform radio resource management (RRM), such as a search task and/or a measurement task, to search for any available cellular resources and/or beam resources and/or to measure the quality of any identified resources. The UE may additionally or alternatively perform, during an SSBS, radio link monitoring (RLM) tasks to manage the link of any identified resources. The UE may additionally or alternatively perform, during an SSBS, loop tracking tasks to synchronize the loops of the UE (e.g., the AGC loops, the TTLs, the FTLs, the PDP loops, and/or the channel estimation loops).

Example techniques disclosed herein enable a UE to perform multiple tasks during a same SSBS to reduce the number of wake-up SSBSs. For example, disclosed techniques enable a UE to perform the RLM tasks and the loop tracking tasks during a first SSBS and thereby reducing the number of wake-up SSBSs from four SSBSs to three SSBSs. In some examples, the UE may also perform the search task or the measurement task during the same first SSBS and, thereby, further reducing the number of wake-up SSBSs from three SSBSs to two SSBSs.

Example techniques disclosed herein may also enable the UE to select which SSBS occurrences to wake-up for during the OFF duration of the CDRX cycle. For example, the different tasks may have respective periods and the SSBS occurrences may also have a respective period. The UE may then determine, based on the determination of which tasks may be performed during a same SSBS occurrence and the different periods, for which SSBS occurrences to wake-up so that certain of the tasks can be maintained (e.g., the loop tracking tasks) and so that the UE can maintain a relatively longer OFF duration during the CDRX cycle.

In an aspect of the disclosure, a method, a computer-readable medium, and an apparatus are provided. An example apparatus for wireless communication at a UE selects a first SSBS occurrence during which to perform a loop tracking task and a RLM task during an OFF duration of a CDRX cycle. The apparatus determines whether the UE can perform a third task associated with at least a frequency range during the first SSBS occurrence. The apparatus performs the third task associated with the at least a frequency range during the first SSBS occurrence.

In additional or alternative examples of the disclosure, a method, a computer-readable medium, and an apparatus are provided. An example apparatus for wireless communication at a UE determines a first SSBS occurrence that is received during a time frame corresponding to a start of an ON duration of a CDRX cycle. The apparatus determines whether the first SSBS occurrence is a shareable SSBS based on whether the UE can perform at least a measurement task and a loop tracking task during the first SSBS occurrence. The apparatus performs the measurement task during the first SSBS occurrence when the first SSBS occurrence is the shareable SSBS and performs the measurement task during a second SSBS occurrence when the first SSBS occurrence is a non-shareable SSBS, the second SSBS occurrence being different than the first SSBS occurrence.

To the accomplishment of the foregoing and related ends, the one or more aspects comprise the features hereinafter fully described and particularly pointed out in the claims. The following description and the annexed drawings set forth in detail certain illustrative features of the one or more aspects. These features are indicative, however, of but a few of the various ways in which the principles of various aspects may be employed, and this description is intended to include all such aspects and their equivalents.

BRIEF DESCRIPTION OF THE DRAWINGS

FIG. 11A illustrates a timeline employing selecting of a shareable SSBS, in accordance with the teachings disclosed herein.

FIG. 11B illustrates a timeline employing selecting of non-shareable SSBSs, in accordance with the teachings disclosed herein.

DETAILED DESCRIPTION

Figure 1:
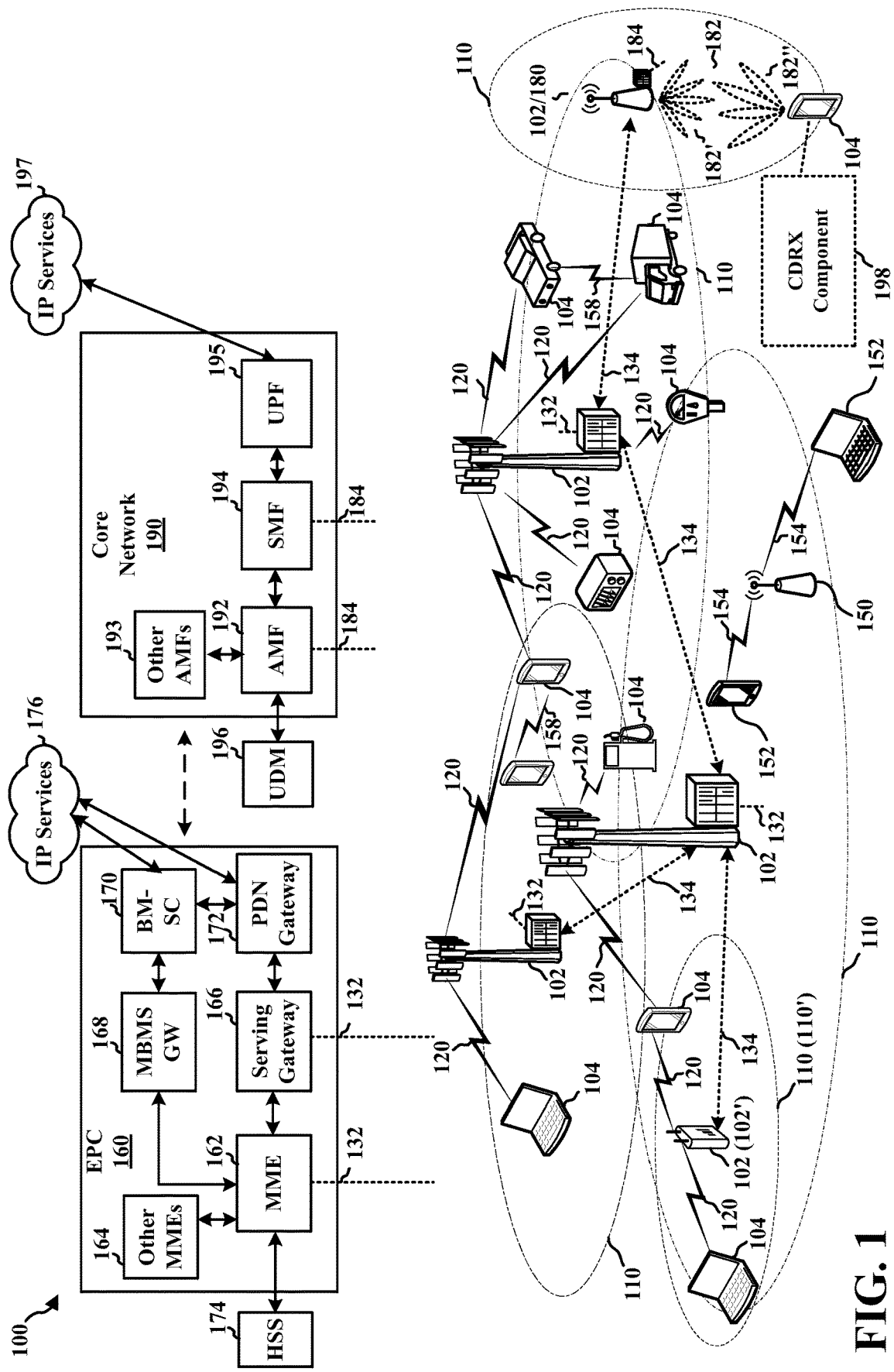
FIG. 1 is a diagram illustrating an example of a wireless communications system and an access network.

The detailed description set forth below in connection with the appended drawings is intended as a description of various configurations and is not intended to represent the only configurations in which the concepts described herein may be practiced. The detailed description includes specific details for the purpose of providing a thorough understanding of various concepts. However, it will be apparent to those skilled in the art that these concepts may be practiced without these specific details. In some instances, well known structures and components are shown in block diagram form in order to avoid obscuring such concepts.

Several aspects of telecommunication systems will now be presented with reference to various apparatus and methods. These apparatus and methods will be described in the following detailed description and illustrated in the accompanying drawings by various blocks, components, circuits, processes, algorithms, etc. (collectively referred to as "elements"). These elements may be implemented using electronic hardware, computer software, or any combination thereof. Whether such elements are implemented as hardware or software depends upon the particular application and design constraints imposed on the overall system.

By way of example, an element, or any portion of an element, or any combination of elements may be implemented as a "processing system" that includes one or more processors. Examples of processors include microprocessors, microcontrollers, graphics processing units (GPUs), central processing units (CPUs), application processors, digital signal processors (DSPs), reduced instruction set computing (RISC) processors, systems on a chip (SoC), baseband processors, field programmable gate arrays (FPGAs), programmable logic devices (PLDs), state machines, gated logic, discrete hardware circuits, and other suitable hardware configured to perform the various functionality described throughout this disclosure. One or more processors in the processing system may execute software. Software shall be construed broadly to mean instructions, instruction sets, code, code segments, program code, programs, subprograms, software components, applications, software applications, software packages, routines, subroutines, objects, executables, threads of execution, procedures, functions, etc., whether referred to as software, firmware, middleware, microcode, hardware description language, or otherwise.

Accordingly, in one or more example embodiments, the functions described may be implemented in hardware, software, or any combination thereof. If implemented in software, the functions may be stored on or encoded as one or more instructions or code on a computer-readable medium. Computer-readable media includes computer storage media. Storage media may be any available media that can be accessed by a computer. By way of example, and not limitation, such computer-readable media can comprise a random-access memory (RAM), a read-only memory (ROM), an electrically erasable programmable ROM (EEPROM), optical disk storage, magnetic disk storage, other magnetic storage devices, combinations of the aforementioned types of computer-readable media, or any other medium that can be used to store computer executable code in the form of instructions or data structures that can be accessed by a computer.

As used herein, the term computer-readable medium is expressly defined to include any type of computer readable storage device and/or storage disk and to exclude propagating signals and to exclude transmission media. As used herein, "computer-readable medium," "machine-readable medium," "computer-readable memory," and "machine-readable memory" are used interchangeably.

FIG. 1 is a diagram illustrating an example of a wireless communications system and an access network 100. The wireless communications system (also referred to as a wireless wide area network (WWAN)) includes base stations 102, UEs 104, an Evolved Packet Core (EPC) 160, and another core network 190 (e.g., a 5G Core (5GC)). The base stations 102 may include macrocells (high power cellular base station) and/or small cells (low power cellular base station). The macrocells include base stations. The small cells include femtocells, picocells, and microcells.

The base stations 102 configured for 4G LTE (collectively referred to as Evolved Universal Mobile Telecommunications System (UMTS) Terrestrial Radio Access Network (E-UTRAN)) may interface with the EPC 160 through backhaul links 132 (e.g., S1 interface). The base stations 102 configured for 5G/NR (collectively referred to as Next Generation RAN (NG-RAN)) may interface with core network 190 through backhaul links 184. In addition to other functions, the base stations 102 may perform one or more of the following functions: transfer of user data, radio channel ciphering and deciphering, integrity protection, header compression, mobility control functions (e.g., handover, dual connectivity), inter-cell interference coordination, connection setup and release, load balancing, distribution for non-access stratum (NAS) messages, NAS node selection, synchronization, radio access network (RAN) sharing, multimedia broadcast multicast service (MBMS), subscriber and equipment trace, RAN information management (RIM), paging, positioning, and delivery of warning messages. The base stations 102 may communicate directly or indirectly (e.g., through the EPC 160 or core network 190) with each other over backhaul links 134 (e.g., X2 interface). The backhaul links 134 may be wired or wireless.

The base stations 102 may wirelessly communicate with the UEs 104. Each of the base stations 102 may provide communication coverage for a respective geographic coverage area 110. There may be overlapping geographic coverage areas 110. For example, the small cell 102' may have a coverage area 110' that overlaps the coverage area 110 of one or more macro base stations 102. A network that includes both small cell and macrocells may be known as a heterogeneous network. A heterogeneous network may also include Home Evolved Node Bs (eNBs) (HeNBs), which may provide service to a restricted group known as a closed subscriber group (CSG). The communication links 120 between the base stations 102 and the UEs 104 may include uplink (UL) (also referred to as reverse link) transmissions from a UE 104 to a base station 102 and/or downlink (DL) (also referred to as forward link) transmissions from a base station 102 to a UE 104. The communication links 120 may use multiple-input and multiple-output (MIMO) antenna technology, including spatial multiplexing, beamforming, and/or transmit diversity. The communication links may be through one or more carriers. The base stations 102/UEs 104 may use spectrum up to Y MHz (e.g., 5, 10, 15, 20, 100, 400, etc. MHz) bandwidth per carrier allocated in a carrier aggregation of up to a total of Yx MHz (x component carriers) used for transmission in each direction. The carriers may or may not be adjacent to each other. Allocation of carriers may be asymmetric with respect to DL and UL (e.g., more or fewer carriers may be allocated for DL than for UL). The component carriers may include a primary component carrier and one or more secondary component carriers. A primary component carrier may be referred to as a primary cell (PCell) and a secondary component carrier may be referred to as a secondary cell (SCell).

Certain UEs 104 may communicate with each other using device-to-device (D2D) communication link 158. The D2D communication link 158 may use the DL/UL WWAN spectrum. The D2D communication link 158 may use one or more sidelink channels, such as a physical sidelink broadcast channel (PSBCH), a physical sidelink discovery channel (PSDCH), a physical sidelink shared channel (PSSCH), and a physical sidelink control channel (PSCCH). D2D communication may be through a variety of wireless D2D communications systems, such as for example, FlashLinQ, WiMedia, Bluetooth, ZigBee, Wi-Fi based on the IEEE 802.11 standard, LTE, or NR.

The wireless communications system may further include a Wi-Fi access point (AP) 150 in communication with Wi-Fi stations (STAs) 152 via communication links 154 in a 5 GHz unlicensed frequency spectrum. When communicating in an unlicensed frequency spectrum, the STAs 152/AP 150 may perform a clear channel assessment (CCA) prior to communicating in order to determine whether the channel is available.

The small cell 102' may operate in a licensed and/or an unlicensed frequency spectrum. When operating in an unlicensed frequency spectrum, the small cell 102' may employ NR and use the same 5 GHz unlicensed frequency spectrum as used by the Wi-Fi AP 150. The small cell 102', employing NR in an unlicensed frequency spectrum, may boost coverage to and/or increase capacity of the access network.

A base station 102, whether a small cell 102' or a large cell (e.g., macro base station), may include an eNB, gNodeB (gNB), or another type of base station. Some base stations, such as gNB 180 may operate in a traditional sub 6 GHz spectrum, in millimeter wave (mmW) frequencies, and/or near mmW frequencies in communication with the UE 104. When the gNB 180 operates in mmW or near mmW frequencies, the gNB 180 may be referred to as an mmW base station. Extremely high frequency (EHF) is part of the RF in the electromagnetic spectrum. EHF has a range of 30 GHz to 300 GHz and a wavelength between 1 millimeter and 10 millimeters. Radio waves in the band may be referred to as a millimeter wave. Near mmW may extend down to a frequency of 3 GHz with a wavelength of 100 millimeters. The super high frequency (SHF) band extends between 3 GHz and 30 GHz, also referred to as centimeter wave. Communications using the mmW/near mmW radio frequency band (e.g., 3 GHz-300 GHz) has extremely high path loss and a short range. The mmW base station 180 may utilize beamforming 182 with the UE 104 to compensate for the extremely high path loss and short range.

The base station 180 may transmit a beamformed signal to the UE 104 in one or more transmit directions 182'. The UE 104 may receive the beamformed signal from the base station 180 in one or more receive directions 182". The UE 104 may also transmit a beamformed signal to the base station 180 in one or more transmit directions. The base station 180 may receive the beamformed signal from the UE 104 in one or more receive directions. The base station 180/UE 104 may perform beam training to determine the best receive and transmit directions for each of the base station 180/UE 104. The transmit and receive directions for the base station 180 may or may not be the same. The transmit and receive directions for the UE 104 may or may not be the same.

The EPC 160 may include a Mobility Management Entity (MME) 162, other MMEs 164, a Serving Gateway 166, a Multimedia Broadcast Multicast Service (MBMS) Gateway 168, a Broadcast Multicast Service Center (BM-SC) 170, and a Packet Data Network (PDN) Gateway 172. The MME 162 may be in communication with a Home Subscriber Server (HSS) 174. The MME 162 is the control node that processes the signaling between the UEs 104 and the EPC 160. Generally, the MME 162 provides bearer and connection management. All user Internet protocol (IP) packets are transferred through the Serving Gateway 166, which itself is connected to the PDN Gateway 172. The PDN Gateway 172 provides UE IP address allocation as well as other functions. The PDN Gateway 172 and the BM-SC 170 are connected to the IP Services 176. The IP Services 176 may include the Internet, an intranet, an IP Multimedia Subsystem (IMS), a PS Streaming Service, and/or other IP services. The BM-SC 170 may provide functions for MBMS user service provisioning and delivery. The BM-SC 170 may serve as an entry point for content provider MBMS transmission, may be used to authorize and initiate MBMS Bearer Services within a public land mobile network (PLMN), and may be used to schedule MBMS transmissions. The MBMS Gateway 168 may be used to distribute MBMS traffic to the base stations 102 belonging to a Multicast Broadcast Single Frequency Network (MBSFN) area broadcasting a particular service, and may be responsible for session management (start/stop) and for collecting eMBMS related charging information.

The core network 190 may include a Access and Mobility Management Function (AMF) 192, other AMFs 193, a Session Management Function (SMF) 194, and a User Plane Function (UPF) 195. The AMF 192 may be in communication with a Unified Data Management (UDM) 196. The AMF 192 is the control node that processes the signaling between the UEs 104 and the core network 190. Generally, the AMF 192 provides QoS flow and session management. All user Internet protocol (IP) packets are transferred through the UPF 195. The UPF 195 provides UE IP address allocation as well as other functions. The UPF 195 is connected to the IP Services 197. The IP Services 197 may include the Internet, an intranet, an IP Multimedia Subsystem (IMS), a PS Streaming Service, and/or other IP services.

The base station may also be referred to as a gNB, Node B, evolved Node B (eNB), an access point, a base transceiver station, a radio base station, a radio transceiver, a transceiver function, a basic service set (BSS), an extended service set (ESS), a transmit reception point (TRP), or some other suitable terminology. The base station 102 provides an access point to the EPC 160 or core network 190 for a UE 104. Examples of UEs 104 include a cellular phone, a smart phone, a session initiation protocol (SIP) phone, a laptop, a personal digital assistant (PDA), a satellite radio, a global positioning system, a multimedia device, a video device, a digital audio player (e.g., MP3 player), a camera, a game console, a tablet, a smart device, a wearable device, a vehicle, an electric meter, a gas pump, a large or small kitchen appliance, a healthcare device, an implant, a sensor/actuator, a display, or any other similar functioning device. Some of the UEs 104 may be referred to as IoT devices (e.g., parking meter, gas pump, toaster, vehicles, heart monitor, etc.). The UE 104 may also be referred to as a station, a mobile station, a subscriber station, a mobile unit, a subscriber unit, a wireless unit, a remote unit, a mobile device, a wireless device, a wireless communications device, a remote device, a mobile subscriber station, an access terminal, a mobile terminal, a wireless terminal, a remote terminal, a handset, a user agent, a mobile client, a client, or some other suitable terminology.

Referring again to FIG. 1, in certain aspects, the UE 104 may be configured to manage one or more aspects of wireless communication via multi-tasking and smart locations selection of reference signals during CDRX. As an example, in FIG. 1, the UE 104 may include a CDRX component 198 configured to select a first SSBS occurrence during which to perform a loop tracking task and a RLM task during an OFF duration of a CDRX cycle. The CDRX component 198 may be further configured to determine whether the UE can perform a third task associated with at least a frequency range during the first SSBS occurrence and may perform the third task associated with the at least a frequency range during the first SSBS occurrence.

In additional or alternative examples, the CDRX component 198 may be configured to determine a first SSBS occurrence that is received during a time frame corresponding to a start of an ON duration of a CDRX cycle. The CDRX component 198 may also be configured to determine whether the first SSBS occurrence is a shareable SSBS based on whether the UE can perform at least a measurement task and a loop tracking task during the first SSBS occurrence. The CDRX component 198 may also be configured to perform the measurement task during the first SSBS occurrence when the first SSBS occurrence is the shareable SSBS and perform the measurement task during a second SSBS occurrence when the first SSBS occurrence is a non-shareable SSBS, the second SSBS occurrence being different than the first SSBS occurrence.

Although the following description may provide examples based on the UE performing tasks "during" an SSBS occurrence, it should be appreciated that the concepts descripted herein may be applicable to examples in which the UE performs the respective task "based on" the SSBS occurrence and/or "using" the SSBS occurrence. For example, the UE may perform (and/or complete) a task after the SSBS occurrence but based on (and/or using) measurements that were made during the SSBS occurrence. Furthermore, although the following description may provide examples based on 5G/NR, it should be appreciated that the concepts described herein may be applicable to other communication technologies. For example, the concepts described herein may be applicable to LTE, LTE-A, CDMA, GSM, and/or other wireless technologies (or RATs) in which a UE may operate in a DRX mode.

Figure 2:
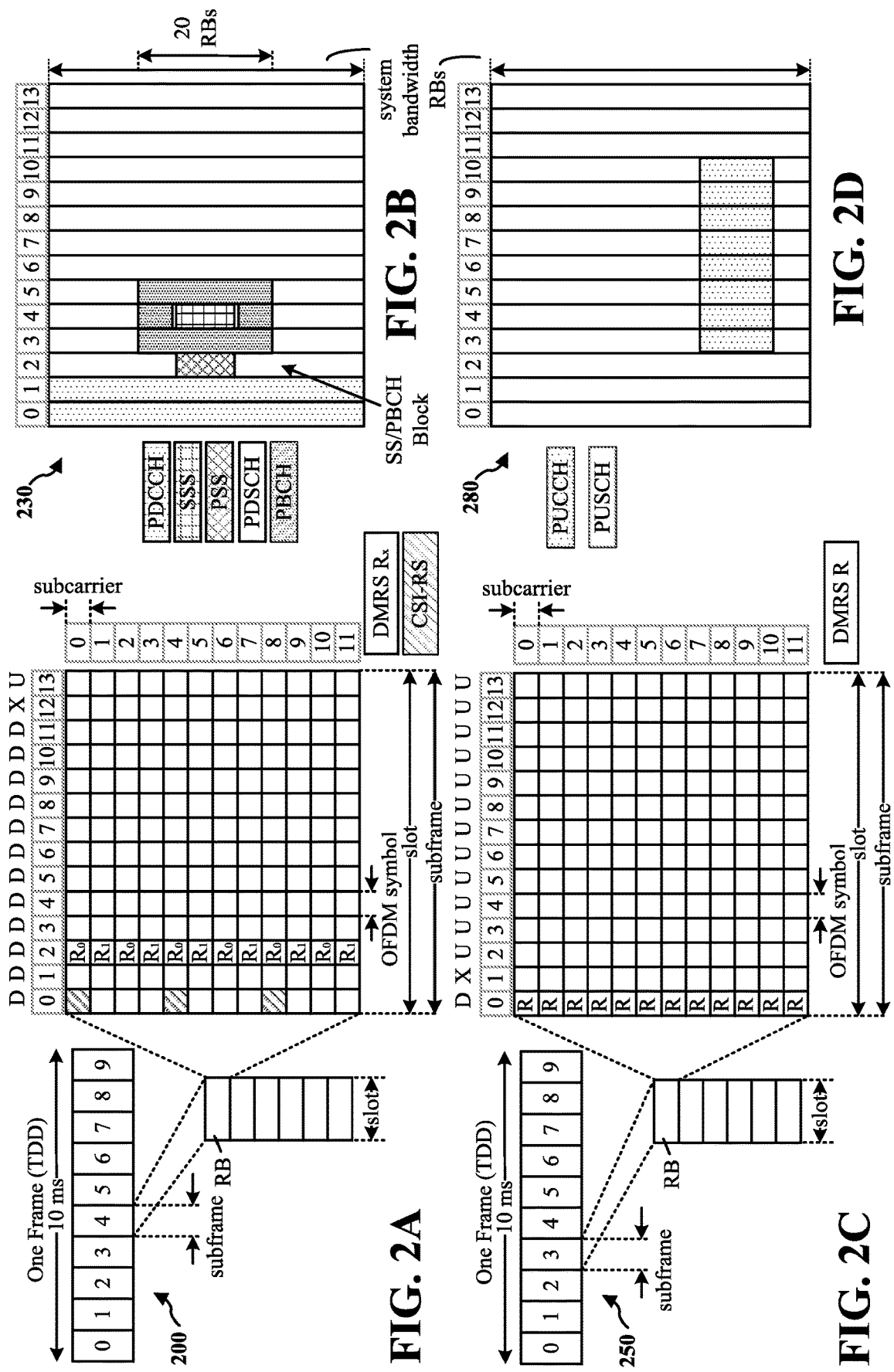
FIGS. 2A, 2B, 2C, and 2D are diagrams illustrating examples of a first 5G/NR frame, DL channels within a 5G/NR subframe, a second 5G/NR frame, and UL channels within a 5G/NR subframe, respectively.

FIG. 2A is a diagram 200 illustrating an example of a first subframe within a 5G/NR frame structure. FIG. 2B is a diagram 230 illustrating an example of DL channels within a 5G/NR subframe. FIG. 2C is a diagram 250 illustrating an example of a second subframe within a 5G/NR frame structure. FIG. 2D is a diagram 280 illustrating an example of UL channels within a 5G/NR subframe. The 5G/NR frame structure may be FDD in which for a particular set of subcarriers (carrier system bandwidth), subframes within the set of subcarriers are dedicated for either DL or UL, or may be TDD in which for a particular set of subcarriers (carrier system bandwidth), subframes within the set of subcarriers are dedicated for both DL and UL. In the examples provided by FIGS. 2A, 2C, the 5G/NR frame structure is assumed to be TDD, with subframe 4 being configured with slot format 28 (with mostly DL), where D is DL, U is UL, and X is flexible for use between DL/UL, and subframe 3 being configured with slot format 34 (with mostly UL). While subframes 3, 4 are shown with slot formats 34, 28, respectively, any particular subframe may be configured with any of the various available slot formats 0-61. Slot formats 0, 1 are all DL, UL, respectively. Other slot formats 2-61 include a mix of DL, UL, and flexible symbols. UEs are configured with the slot format (dynamically through DL control information (DCI), or semi-statically/statically through radio resource control (RRC) signaling) through a received slot format indicator (SFI). Note that the description infra applies also to a 5G/NR frame structure that is TDD.

Other wireless communication technologies may have a different frame structure and/or different channels. A frame (10 ms) may be divided into 10 equally sized subframes (1 ms). Each subframe may include one or more time slots. Subframes may also include mini-slots, which may include 7, 4, or 2 symbols. Each slot may include 7 or 14 symbols, depending on the slot configuration. For slot configuration 0, each slot may include 14 symbols, and for slot configuration 1, each slot may include 7 symbols. The symbols on DL may be cyclic prefix (CP) OFDM (CP-OFDM) symbols. The symbols on UL may be CP-OFDM symbols (for high throughput scenarios) or discrete Fourier transform (DFT) spread OFDM (DFT-s-OFDM) symbols (also referred to as single carrier frequency-division multiple access (SC-FDMA) symbols) (for power limited scenarios; limited to a single stream transmission). The number of slots within a subframe is based on the slot configuration and the numerology. For slot configuration 0, different numerologies 0 to 5 allow for 1, 2, 4, 8, 16, and 32 slots, respectively, per subframe. For slot configuration 1, different numerologies 0 to 2 allow for 2, 4, and 8 slots, respectively, per subframe. Accordingly, for slot configuration 0 and numerology $\mu$, there are 14 symbols/slot and $2\mu$ slots/subframe. The subcarrier spacing and symbol length/duration are a function of the numerology. The subcarrier spacing may be equal to $2^{\mu}*15$ kHz, where $\mu$ is the numerology 0 to 5. As such, the numerology $\mu=0$ has a subcarrier spacing of 15 kHz and the numerology $\mu=5$ has a subcarrier spacing of 480 kHz. The symbol length/duration is inversely related to the subcarrier spacing. FIGS. 2A to 2D provide an example of slot configuration 0 with 14 symbols per slot and numerology $\mu=0$ with 1 slot per subframe. The subcarrier spacing is 15 kHz and symbol duration is approximately 66.7 µs.

A resource grid may be used to represent the frame structure. Each time slot includes a resource block (RB) (also referred to as physical RBs (PRBs)) that extends 12 consecutive subcarriers. The resource grid is divided into multiple resource elements (REs). The number of bits carried by each RE depends on the modulation scheme.

As illustrated in FIG. 2A, some of the REs carry reference (pilot) signals (RS) for the UE. The RS may include demodulation RS (DM-RS) (indicated as Rx for one particular configuration, where 100x is the port number, but other DM-RS configurations are possible) and channel state information reference signals (CSI-RS) for channel estimation at the UE. The RS may also include beam measurement RS (BRS), beam refinement RS (BRRS), and phase tracking RS (PT-RS).

FIG. 2B illustrates an example of various DL channels within a subframe of a frame. The physical downlink control channel (PDCCH) carries DCI within one or more control channel elements (CCEs), each CCE including nine RE groups (REGs), each REG including four consecutive REs in an OFDM symbol. A primary synchronization signal (PSS) may be within symbol 2 of particular subframes of a frame. The PSS is used by a UE 104 to determine subframe/symbol timing and a physical layer identity. A secondary synchronization signal (SSS) may be within symbol 4 of particular subframes of a frame. The SSS is used by a UE to determine a physical layer cell identity group number and radio frame timing. Based on the physical layer identity and the physical layer cell identity group number, the UE can determine a physical cell identifier (PCI). Based on the PCI, the UE can determine the locations of the aforementioned DM-RS. The physical broadcast channel (PBCH), which carries a master information block (MIB), may be logically grouped with the PSS and SSS to form a synchronization signal (SS)/PBCH block. The MIB provides a number of RBs in the system bandwidth and a system frame number (SFN). The physical downlink shared channel (PDSCH) carries user data, broadcast system information not transmitted through the PBCH such as system information blocks (SIBs), and paging messages.

As illustrated in FIG. 2C, some of the REs carry DM-RS (indicated as R for one particular configuration, but other DM-RS configurations are possible) for channel estimation at the base station. The UE may transmit DM-RS for the physical uplink control channel (PUCCH) and DM-RS for the physical uplink shared channel (PUSCH). The PUSCH DM-RS may be transmitted in the first one or two symbols of the PUSCH. The PUCCH DM-RS may be transmitted in different configurations depending on whether short or long PUCCHs are transmitted and depending on the particular PUCCH format used. Although not shown, the UE may transmit sounding reference signals (SRS). The SRS may be used by a base station for channel quality estimation to enable frequency-dependent scheduling on the UL.

FIG. 2D illustrates an example of various UL channels within a subframe of a frame. The PUCCH may be located as indicated in one configuration. The PUCCH carries uplink control information (UCI), such as scheduling requests, a channel quality indicator (CQI), a precoding matrix indicator (PMI), a rank indicator (RI), and HARQ ACK/NACK feedback. The PUSCH carries data, and may additionally be used to carry a buffer status report (BSR), a power headroom report (PHR), and/or UCI.

Figure 3:
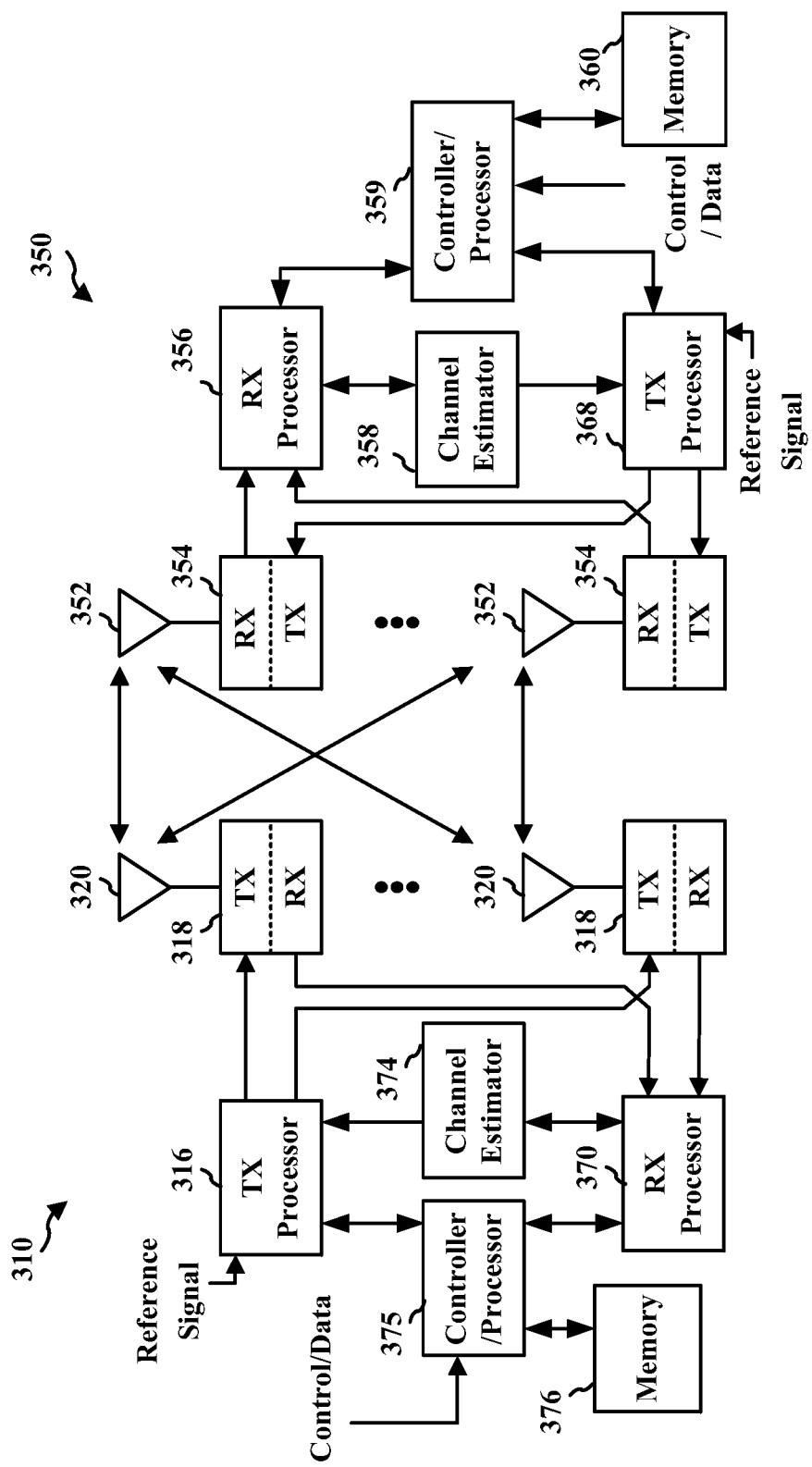
FIG. 3 is a diagram illustrating an example of a base station and user equipment (UE) in an access network.

FIG. 3 is a block diagram of a base station 310 in communication with a UE 350 in an access network. In the DL, IP packets from the EPC 160 may be provided to a controller/processor 375. The controller/processor 375 implements layer 3 and layer 2 functionality. Layer 3 includes a radio resource control (RRC) layer, and layer 2 includes a service data adaptation protocol (SDAP) layer, a packet data convergence protocol (PDCP) layer, a radio link control (RLC) layer, and a medium access control (MAC) layer. The controller/processor 375 provides RRC layer functionality associated with broadcasting of system information (e.g., MIB, SIBs), RRC connection control (e.g., RRC connection paging, RRC connection establishment, RRC connection modification, and RRC connection release), inter radio access technology (RAT) mobility, and measurement configuration for UE measurement reporting; PDCP layer functionality associated with header compression/decompression, security (ciphering, deciphering, integrity protection, integrity verification), and handover support functions; RLC layer functionality associated with the transfer of upper layer packet data units (PDUs), error correction through ARQ, concatenation, segmentation, and reassembly of RLC service data units (SDUs), re-segmentation of RLC data PDUs, and reordering of RLC data PDUs; and MAC layer functionality associated with mapping between logical channels and transport channels, multiplexing of MAC SDUs onto transport blocks (TBs), demultiplexing of MAC SDUs from TBs, scheduling information reporting, error correction through HARQ, priority handling, and logical channel prioritization.

The transmit (TX) processor 316 and the receive (RX) processor 370 implement layer 1 functionality associated with various signal processing functions. Layer 1, which includes a physical (PHY) layer, may include error detection on the transport channels, forward error correction (FEC) coding/decoding of the transport channels, interleaving, rate matching, mapping onto physical channels, modulation/ demodulation of physical channels, and MIMO antenna processing. The TX processor 316 handles mapping to signal constellations based on various modulation schemes (e.g., binary phase-shift keying (BPSK), quadrature phase-shift keying (QPSK), M-phase-shift keying (M-PSK), M-quadrature amplitude modulation (M-QAM)). The coded and modulated symbols may then be split into parallel streams. Each stream may then be mapped to an OFDM subcarrier, multiplexed with a reference signal (e.g., pilot) in the time and/or frequency domain, and then combined together using an Inverse Fast Fourier Transform (IFFT) to produce a physical channel carrying a time domain OFDM symbol stream. The OFDM stream is spatially precoded to produce multiple spatial streams. Channel estimates from a channel estimator 374 may be used to determine the coding and modulation scheme, as well as for spatial processing. The channel estimate may be derived from a reference signal and/or channel condition feedback transmitted by the UE 350. Each spatial stream may then be provided to a different antenna 320 via a separate transmitter 318TX. Each transmitter 318TX may modulate an RF carrier with a respective spatial stream for transmission.

At the UE 350, each receiver 354RX receives a signal through its respective antenna 352. Each receiver 354RX recovers information modulated onto an RF carrier and provides the information to the receive (RX) processor 356. The TX processor 368 and the RX processor 356 implement layer 1 functionality associated with various signal processing functions. The RX processor 356 may perform spatial processing on the information to recover any spatial streams destined for the UE 350. If multiple spatial streams are destined for the UE 350, they may be combined by the RX processor 356 into a single OFDM symbol stream. The RX processor 356 then converts the OFDM symbol stream from the time-domain to the frequency domain using a Fast Fourier Transform (FFT). The frequency domain signal comprises a separate OFDM symbol stream for each subcarrier of the OFDM signal. The symbols on each subcarrier, and the reference signal, are recovered and demodulated by determining the most likely signal constellation points transmitted by the base station 310. These soft decisions may be based on channel estimates computed by the channel estimator 358. The soft decisions are then decoded and deinterleaved to recover the data and control signals that were originally transmitted by the base station 310 on the physical channel. The data and control signals are then provided to the controller/processor 359, which implements layer 3 and layer 2 functionality.

The controller/processor 359 can be associated with a memory 360 that stores program codes and data. The memory 360 may be referred to as a computer-readable medium. In the UL, the controller/processor 359 provides demultiplexing between transport and logical channels, packet reassembly, deciphering, header decompression, and control signal processing to recover IP packets from the EPC 160. The controller/processor 359 is also responsible for error detection using an ACK and/or NACK protocol to support HARQ operations.

Similar to the functionality described in connection with the DL transmission by the base station 310, the controller/processor 359 provides RRC layer functionality associated with system information (e.g., MIB, SIBs) acquisition, RRC connections, and measurement reporting; PDCP layer functionality associated with header compression/decompression, and security (ciphering, deciphering, integrity protection, integrity verification); RLC layer functionality associated with the transfer of upper layer PDUs, error correction through ARQ, concatenation, segmentation, and reassembly of RLC SDUs, re-segmentation of RLC data PDUs, and reordering of RLC data PDUs; and MAC layer functionality associated with mapping between logical channels and transport channels, multiplexing of MAC SDUs onto TBs, demultiplexing of MAC SDUs from TBs, scheduling information reporting, error correction through HARQ, priority handling, and logical channel prioritization.

Channel estimates derived by a channel estimator 358 from a reference signal or feedback transmitted by the base station 310 may be used by the TX processor 368 to select the appropriate coding and modulation schemes, and to facilitate spatial processing. The spatial streams generated by the TX processor 368 may be provided to different antenna 352 via separate transmitters 354TX. Each transmitter 354TX may modulate an RF carrier with a respective spatial stream for transmission.

The UL transmission is processed at the base station 310 in a manner similar to that described in connection with the receiver function at the UE 350. Each receiver 318RX receives a signal through its respective antenna 320. Each receiver 318RX recovers information modulated onto an RF carrier and provides the information to a RX processor 370.

The controller/processor 375 can be associated with a memory 376 that stores program codes and data. The memory 376 may be referred to as a computer-readable medium. In the UL, the controller/processor 375 provides demultiplexing between transport and logical channels, packet reassembly, deciphering, header decompression, control signal processing to recover IP packets from the UE 350. IP packets from the controller/processor 375 may be provided to the EPC 160. The controller/processor 375 is also responsible for error detection using an ACK and/or NACK protocol to support HARQ operations.

At least one of the TX processor 368, the RX processor 356, and the controller/processor 359 of the UE 350 may be configured to perform aspects in connection with the CDRX component 198 of FIG. 1.

At times, a UE may operate in accordance with a CDRX cycle to conserve power. When operating in accordance with the CDRX cycle, the UE may wake-up and actively communicate with a network device, such as a base station, during an ON duration of the CDRX cycle. The UE may then enter a sleep state during an OFF duration of the CDRX cycle. When the UE operates in the OFF duration, a main modem of the UE may be operated at a lower power level or turned off, and loops of the UE (e.g., AGC loops, TTLs, FTLs, PDP loops, and/or channel estimation loops) may lose synchronization.

Synchronization signals, including SSBs and SSBSs, are reference signals that may be periodically transmitted by the network and received by the UE. In some examples, the UE may use the synchronization signals received during the OFF duration of a CDRX cycle to perform one or more tasks in preparation for the upcoming ON duration of the CDRX cycle. For example, the UE may, during an SSBS, perform RRM, such as a search task and/or a measurement task, to search for any available cellular resources and/or beam resources and/or to measure the quality of any identified resources. The UE may also perform, during an SSBS, RLM tasks to manage the link of any identified resources. The UE may also perform, during an SSBS, loop tracking tasks to synchronize the loops of the UE (e.g., the AGC loops, the TTLs, the FTLs, the PDP loops, and/or the channel estimation loops).

In some examples, certain information may be useful for performing certain of the tasks. For example, the search task and/or the measurement task may use SSBS resources within a synchronization signal based measurement timing configuration (SMTC) window. In some examples, an SMTC window duration may be durations such as 1 ms, 2 ms, etc. In some examples, an SMTC periodicity may range from 5 ms to 160 ms. In some examples, an SMTC window timing offset may range from 0 ms to the SMTC periodicity minus one. In general, the SMTC periodicity may be longer than the SSBS duration. For example, an SSBS periodicity may be 20 ms and the SMTC periodicity may be 40 ms.

Figure 4:
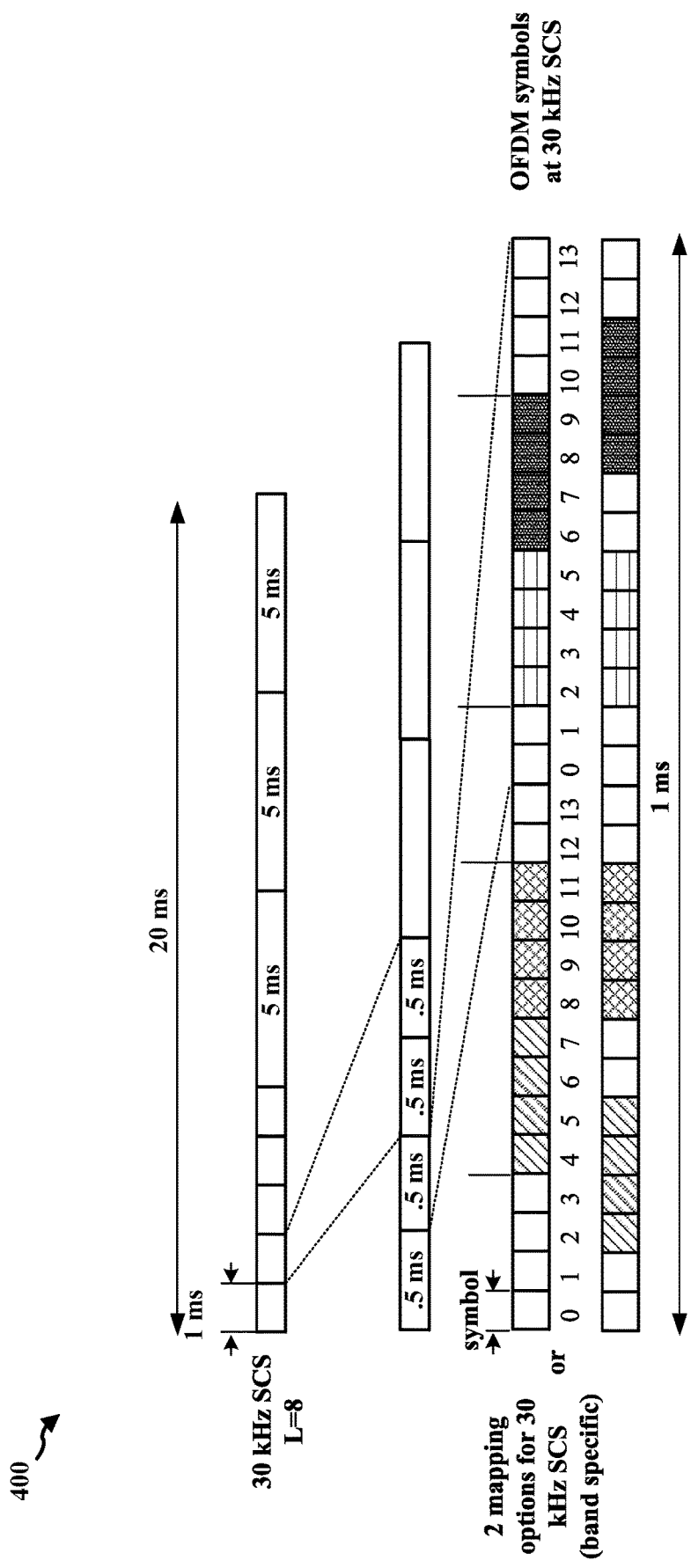
FIG. 4 illustrates an example SS block location mapping, in accordance with the teachings disclosed herein.

FIG. 4 illustrates an example SS block location mapping 400. The example SS block location mapping 400 illustrates an example window of 20 ms and illustrates that an SSBS occurrence may last 0.5 ms (e.g., two SSBS occurrence s occur within a 1 ms period). The example SS block location mapping 400 illustrates two example mapping options based on different frequency bands. In the illustrated example of FIG. 4, each mapping option illustrates that an SSBS occurrence may include 14 different SSBs (e.g., ranging from 0 to 13). For example, each SSBS of FIG. 4 includes multiple SSBs, and each SSB corresponds to a different UE beam.

It should be appreciated that in some examples, the UE may wake-up for different SSBS occurrences to perform different ones of the tasks. However, waking up multiple times for an SSBS may increase power consumption at the UE, especially when the UE is operating in CDRX mode. Furthermore, it should be appreciated that the location of the wake-up SSBSs (e.g., when the SSBs are received) may be used to increase power saving while operating in CDRX mode. For example, the SSBS occurrences may have a periodicity so that multiple SSBS occurrences may occur during an OFF duration. In some such examples, the UE may select certain SSBS occurrences for wake-up in order to increase the time between the wake-up SSBS occurrences. The increased time between wake-up SSBS occurrences helps to improve power efficiency at the UE.

Example techniques disclosed herein enable a UE to perform multiple tasks during a same SSBS to reduce the number of wake-up SSBSs. For example, aspects may enable a UE to perform the RLM tasks and the loop tracking tasks during a single SSBS. The use of a single SSBS for RLM tasks and loop tracking tasks may enable the UE to reduce the number of wake-up SSBSs from four SSBSs to three SSBSs. In some examples, the UE may also perform the search task or the measurement task during the same SSBS and, thereby, may enable the UE to further reduce the number of wake-up SSBSs from three SSBSs to two SSBSs.

Example techniques disclosed herein may also enable the UE to select the SSBS occurrences for wake-up during the OFF duration of the CDRX cycle. For example, the different tasks may have respective periods and the SSBS occurrences may also have a respective period. The UE may determine, based on the determination of which tasks may be performed during a same SSBS occurrence and the different periods, the particular SSBS occurrences for which the UE will wake-up. The SSBS occurrences may be selected so that some of the tasks can be maintained (e.g., the loop tracking tasks) and so that the UE can maintain a relatively longer OFF duration.

Figure 5:
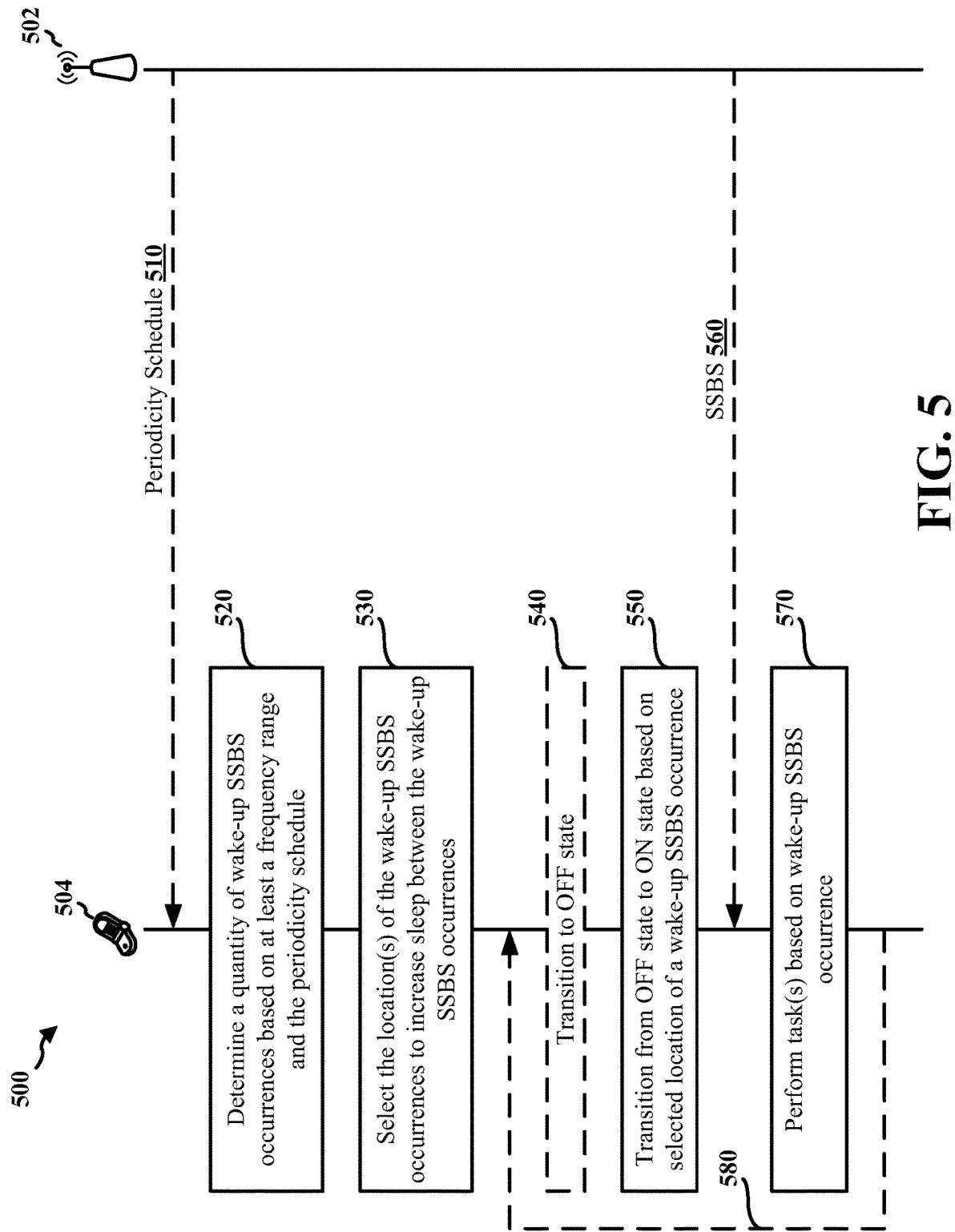
FIG. 5 is an example communication flow between a base station and a UE, in accordance with the teachings disclosed herein.

FIG. 5 illustrates an example of wireless communication 500 between a base station 502 and a UE 504, as presented herein. One or more aspects of the base station 502 may be implemented by the base station 102/180 of FIG. 1 and/or the base station 310 of FIG. 3. One or more aspects of the UE 504 may be implemented by the UE 104 of FIG. 1 and/or the UE 350 of FIG. 3.

It should be appreciated that while the wireless communication 500 includes one base station 502 in communication with one UE 504, in additional or alternative examples, the base station 502 may be in communication with any suitable quantity of UEs 504 and/or base stations 502, and/or the UE 504 may be in communication with any suitable quantity of base stations 502 and/or UEs 504. Furthermore, while the wireless communication 500 includes an example SSBS transmission 560, it should be appreciated that in additional or alternative examples, the wireless communication 500 may include a plurality of SSBS transmissions that may be transmitted periodically from the base station 502 to the UE 504 and/or other UEs.

In the illustrated example of FIG. 5, the base station 502 may transmit a periodicity schedule 510 to the UE 504. The periodicity schedule 510 may configure the UE 504 to perform one or more of the tasks based on one or more periods. For example, the periodicity schedule 510 may configure the UE 504 to perform a search task every eight CDRX cycles, may configure the UE 504 to perform a measurement task every eight CDRX cycles, may configure the UE 504 to perform a loop tracking task every 160 ms, and may configure the UE 504 to perform the RLM task every 320 ms. The base station 502 may transmit the periodicity schedule 510 via a master information block (MIB), a system information block (SIB), RRC signaling, downlink control information (DCI) signaling, and/or a medium access control-control element (MAC-CE).

At 520, the UE 504 may determine a quantity of wake-up SSBS occurrences during which to facilitate the performing of the different tasks based on at least a frequency range and the periodicity schedule. As described above, in some examples, the UE 504 may be able to perform multiple tasks during the same SSBS occurrence to reduce the number of wake-up SSBS occurrences while operating in the CDRX mode. In some examples, different tasks may be multi-tasked based on, for example, a frequency range. For example, when the UE 504 is operating in the sub-6 GHz frequency range (FR1), the UE 504 may not perform beam scheduling. Accordingly, when the UE 504 is operating in FR1, the UE 504 may determine to perform the search task, the loop tracking task, and the RLM task during the same SSBS occurrence. In other examples, the UE 504 may determine to perform the measurement task, the loop tracking task, and the RLM task during the same SSBS occurrence.

In other examples, the UE 504 may be operating in a millimeter wave (mmW) frequency range (FR2) and may perform UE beam scheduling. In some examples, when the UE 504 is operating in FR2, different ones of the tasks may use different information for performing the respective tasks. For example, when the UE 504 is performing the search task, the UE beams may be selected in a round-robin fashion. For example, if the UE 504 has access to eight different beams, the UE 504 may select a first UE beam for performing a first search task, may select the next UE beam for performing a second search task, etc. Thus, when performing the search task, the 504 may be performing a search to identify any cell resources and/or beam resources that are available to the UE and, thus, the UE 504 may utilize any one SSBS because each SSBS contains different SSBs (and corresponding UE beams) (as shown in connection with FIG. 4).

When the UE 504 is performing the measurement task, the UE beams may be selected per SSB instead of per SSBS. As described above, each SSB corresponds to a respective UE beam and performing the measurement task facilities measuring the quality of an identified resource. Thus, for each beam for which the UE 504 wants to measure the quality, the UE 504 may get one chance for the respective beam.

When the UE 504 is performing the loop tracking task, the UE beams may be selected with respect to a serving beam. For example, the loop tracking task facilitates synchronizing the AGC loops, the TTL loops, the FTL loops, the PDP loops, and/or the channel estimation loops. Thus, to facilitate the performing of the loop tracking task, the UE 504 may measure characteristics associated with the serving beam.

When the UE 504 is performing the RLM task, the UE beams may be selected with respect to virtual serving beams. It should be appreciated that the virtual serving beams may overlap with the serving beam. Thus, to facilitate the performing of the RLM task, the UE 504 may measure characteristics associated with the serving beam.

Based on the different parameters associated with performing the different tasks (e.g., the search task, the measurement task, the loop tracking tasks, and the RLM task), some of the tasks may be performed during the same SSBS while the UE 504 is operating in FR2. For example, the UE 504 may perform the loop tracking task and the RLM task during the same SSBS occurrence. Furthermore, as performing the search task facilities the searching of any available cell resources and/or beam resources, in some examples, the performing of the search task may not be shared with the other tasks while the UE 504 is operating in FR2.

In some examples, the UE 504 may also be able to perform the measurement task with the loop tracking task and the RLM task while operating in FR2. However, as the measurement task facilitates measuring the quality of a resource, it may be beneficial for the corresponding beam to satisfy certain thresholds. For example, the UE 504 may measure the signal to interference and noise ratio (SINR) associated with the widest serving beam and compare the measured SINR to a measurement threshold (e.g., an SINR threshold). In some examples, when the measured SINR satisfies the SINR threshold, the UE 504 may determine that the serving beam may be used for performing the measurement task and, thus, the serving beam may be used for performing the measurement task, the loop tracking task, and the RLM task.

However, when the measured SINR does not satisfy the SINR threshold, the UE 504 may determine to enable a beam refinement mode to further refine the beam for performing the measurement task. In some such examples, the UE 504 may perform, during separate SSBS occurrences, the measurement task and the loop tracking and RLM tasks. For example, the UE 504 may determine to perform the measurement task during an SSBS occurrence and may perform the loop tracking task and the RLM task during a different SSBS occurrence.

Thus, while operating in FR2, the UE 504 may perform the different tasks (e.g., the search task, the measurement task, the loop tracking task, and the RLM task) during two or three SSBS occurrences based on whether the beam refinement mode is enabled or disabled. For example, when the beam refinement mode is not enabled (e.g., the measured SINR satisfies the SINR threshold), the UE 504 may perform the measurement task, the loop tracking task, and the RLM task during a first SSBS occurrence, and may perform the search task during a second SSBS occurrence. In other examples in which the beam refinement mode is enabled (e.g., the measured SINR did not satisfy the SINR threshold), the UE 504 may perform the measurement task during a first SSBS, may perform the loop tracking task and the RLM task during a second SSBS occurrence, and may perform the search task during a third SSBS occurrence.

Although the above disclosure described that the determining, at 520, of the quantity of wake-up SSBS occurrences during which the performing of the different tasks may be different based on whether the UE is operating in FR1 or FR2, it should be appreciated that in other examples, the UE may utilize different techniques for determining the quantity of wake-up SSBS occurrences. For example, the above disclosure described that when the UE is operating in FR1, then the UE may not perform beam scheduling, and that when the UE is operating in FR2, then the UE may perform beam scheduling. However, it should be appreciated that in additional or alternative examples, the UE may perform beam scheduling while operating in FR1 and/or the UE may not perform beam scheduling while operating in FR2. In some such examples, it should be appreciated that the disclosed techniques are not limited to a particular frequency range being associated with beam scheduling being performed or not being performed. For example, the determining of the quantity of wake-up SSBS occurrence during which the performing of the different tasks may be based on whether the UE is performing beam scheduling.

At 530, the UE 504 may select the location(s) of the wake-up SSBS occurrences to increase sleep between the wake-up SSBS occurrences.

Once the UE 504 determines, at 520, how many SSBS occurrences may be needed for performing the different tasks, the UE 504 may then select, at 530, the location(s) of the different wake-up SSBS occurrences to increase sleep between the wake-up SSBS occurrences (e.g., to increase the duration of the sleep state of the UE 504). For example, the UE 504 may select certain ones of the SSBS occurrences for improved loop tracking and/or for increasing the duration of the sleep state. For example, the UE 504 may select the SSBS occurrence during the OFF duration that is within a certain time frame of the start of the ON duration (e.g., may pick the closest SSBS occurrence to the start of the ON duration during the OFF duration). In some such examples, the UE 504 may perform at least the loop tracking task and the RLM task during the selected SSBS occurrence. In some examples, when the UE 504 is operating in FR1, the UE 504 may also perform the search task or the measurement task during the selected SSBS occurrence. In some examples, when the UE 504 is operating in FR2, the UE 504 may perform the measurement task during the selected SSBS occurrence when, for example, the beam refinement mode is not enabled.

The UE 504 may then transition between the ON state and the OFF state based on the CDRX cycle and the selected locations of the wake-up SSBS occurrences. For example, the UE 504 may transition, at 540, to the OFF state to conserve power during an OFF duration of the CDRX cycle. At 550, the UE 504 may transition from the OFF state to the ON state based on a selected location of a wake-up SSBS occurrence. It should be appreciated that in some examples, the UE 504 may remain in the OFF state while other SSBS occurrences may occur during the OFF duration of the CDRX cycle. For example, based on the SSBS periodicity and the duration of the CDRX cycle, one or more SSBS occurrences may occur during the OFF duration that the UE 504 discards (e.g., does not transition to the ON state to receive).

The UE 504 may then receive a scheduled wake-up SSBS transmission 560 while in the ON state. The UE 504 may then perform, at 570, one or more task(s) based on the wake-up SSBS transmission 560. For example, while operating in FR1, the UE 504 may perform the search task, the loop tracking task, and the RLM task or may perform the measurement task, the loop tracking task, and the RLM task. In other examples while operating in FR2, the UE 504 may perform the search task, may perform the loop tracking task, the RLM task, and/or may perform the measurement task.

In some examples, at 580, the UE 504 may then return to transition, at 540, to the OFF state. In certain such examples, the UE 504 may transition to the OFF state based on the location of the next wake-up SSBS occurrence.

Figure 6:
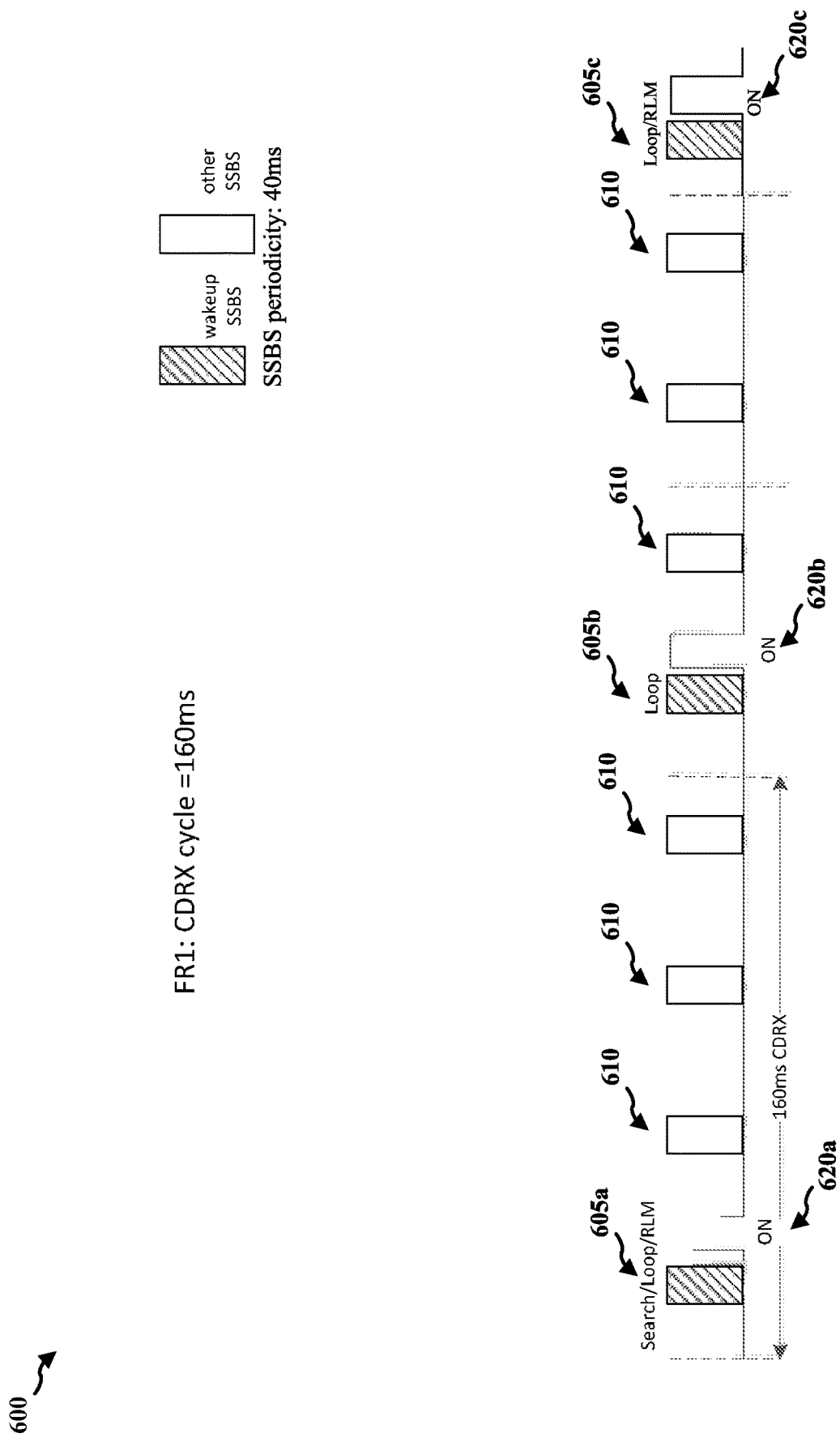
FIGS. 6, 7, and 8 illustrate example schedules of SSBS occurrences when multi-tasking is enabled, in accordance with the teachings disclosed herein.

FIG. 6 illustrates an example schedule 600 of SSBS occurrences when multi-tasking is enabled. In the illustrated example, the schedule 600 corresponds to a UE operating in FR1. In the illustrated example, the UE may be configured (e.g., based on the periodicity schedule 510 of FIG. 5) to perform the search task every eight CDRX cycles, to perform the measurement task every eight CDRX cycles, to perform the loop tracking task every 160 ms, and to perform the RLM task every 320 ms. It should be appreciated that in some examples, the UE may replace the performing of the measurement task with the performing of the search task. For example, performing the search task facilitates the searching of cell resources and/or beam resources that are available to the UE. In certain such examples, the UE may also perform the measurement task as part of the search task to measure the quality of any identified cell resources and/or beam resources. Thus, in some examples, when the UE performs a search task, the UE may replace the subsequent performing of the measurement task if, for example, the respective periodicities of the search task and the measurement task are satisfied based on the performed search task.

In the illustrated example of FIG. 6, the CDRX cycle has a duration of 160 ms and the SSBS periodicity is 40 ms. Accordingly, each CDRX cycle of the example schedule 600 includes four SSBS occurrences. Furthermore, as described above, the UE may discard (or ignore) certain of the SSBS occurrences. Thus, the example schedule 600 illustrates wake-up SSBS occurrences 605 (e.g., SSBS occurrences for which the UE wakes-up for from an OFF duration) and other SSBS occurrences 610 (e.g., SSBS occurrences that the UE ignores).

In the illustrated example of FIG. 6, the UE is operating in FR1. Accordingly, during a same SSBS occurrence, the UE may perform (1) the loop tracking task, (2) the RLM task, and (3) one of the search task or the measurement task. Furthermore, to improve the performance of the loop tracking task, the UE may select an SSBS occurrence during an OFF duration that is closest to the start of an ON duration.

For example, in the illustrated schedule 600 of FIG. 6, the UE selects a first wake-up SSBS occurrence 605*a* during which to perform the search task, the loop tracking task, and the RLM task. As shown in the illustrated example, the first wake-up SSBS occurrence 605*a* is the closest SSBS occurrence located during the OFF duration and before the start of an ON duration 620*a*. The performing of the search task by the UE may replace the performing of the measurement task. Based on the configured periodicity of the search task and the measurement task, the UE may not perform the search task and the measurement task until the eighth subsequent CDRX cycle.

Furthermore, as the UE in the illustrated example is configured to perform the loop tracking task every 160 ms, the UE performs the first loop tracking task during the first wake-up SSBS occurrence 605*a*, selects a second wake-up SSBS occurrence 605*b* during which to perform a second loop tracking task, and selects a third wake-up SSBS occurrence 605*c* during which to perform a third loop tracking task. As shown in the illustrated example, the second wake-up SSBS occurrence 605*b* is the closest SSBS occurrence located during the OFF duration and before the start of an ON duration 620*b*. Similarly, the third wake-up SSBS occurrence 605*c* is the closest SSBS occurrence located during the OFF duration and before the start of an ON duration 620*c*.

Furthermore, as the UE in the illustrated example of FIG. 6 is configured to perform the RLM task every 320 ms, the UE performs the first RLM task during the first wake-up SSBS occurrence 605*a*, and selects the third wake-up SSBS occurrence 605*c* during which to perform a second RLM task. As shown in the illustrated schedule 600 of FIG. 6, the third wake-up SSBS occurrence 605*c* occurs 320 ms after the first wake-up SSBS occurrence 605*a*.

Thus, as shown in the illustrated example of FIG. 6, by multitasking certain of the tasks during the same SSBS occurrences, the number of SSBS occurrences allocated for performing the different tasks may be reduced. For example, instead of waking-up for six different SSBS occurrences to perform the different tasks (e.g., the three loop tracking tasks, the two RLM tasks, and the one search task), the example schedule 600 enables the UE to select three wake-up SSBS occurrences 605 during which to perform the six different tasks (e.g., by performing the first loop tracking task, the first RLM task, and the one search task during the first wake-up SSBS occurrence 605*a*, by performing the second loop tracking task during the second wake-up SSBS occurrence 605*b*, and by performing the third loop tracking task and the second RLM task during the third wake-up SSBS occurrence 605*c*).

Figure 7:
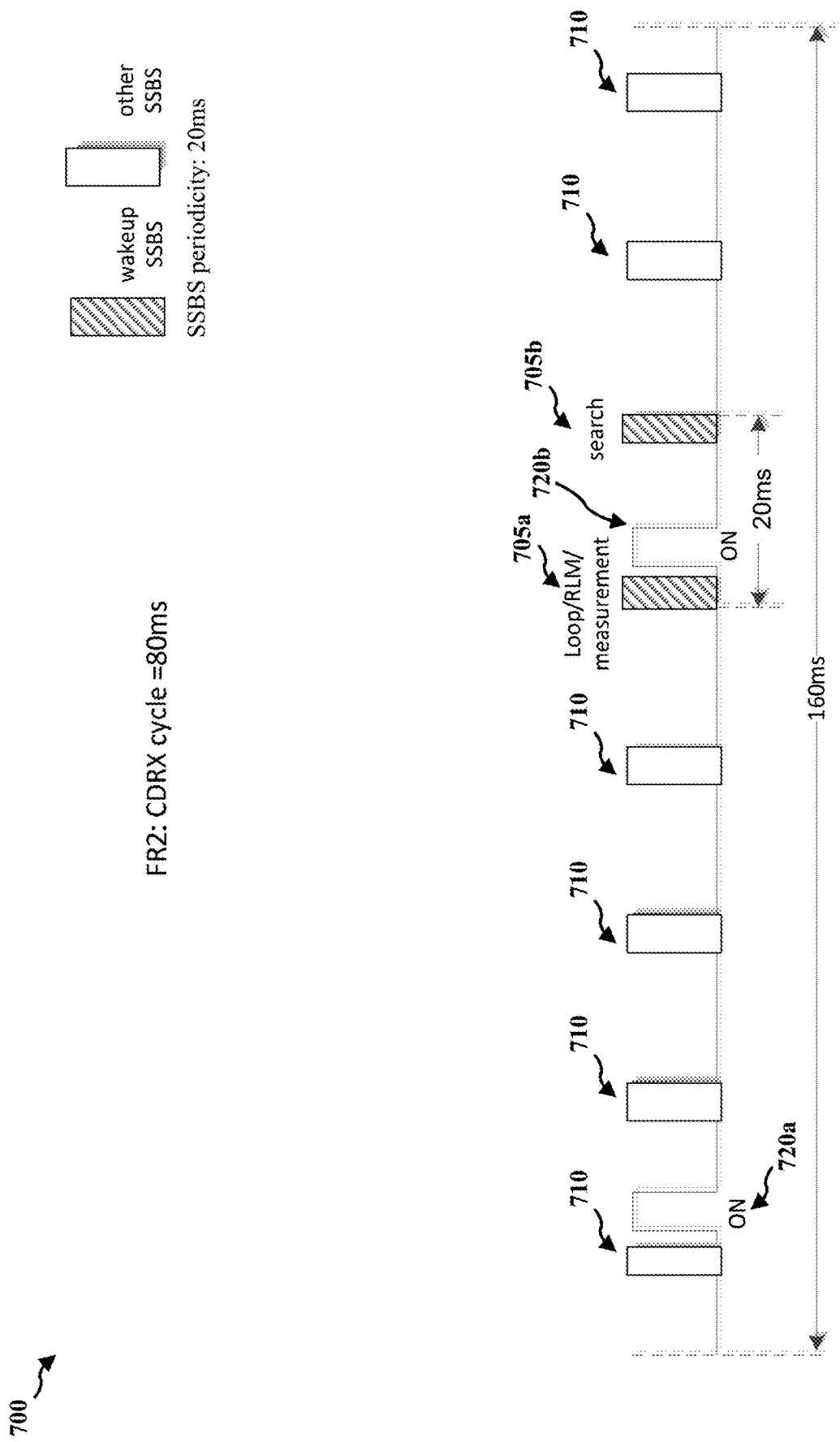
Figure 8:
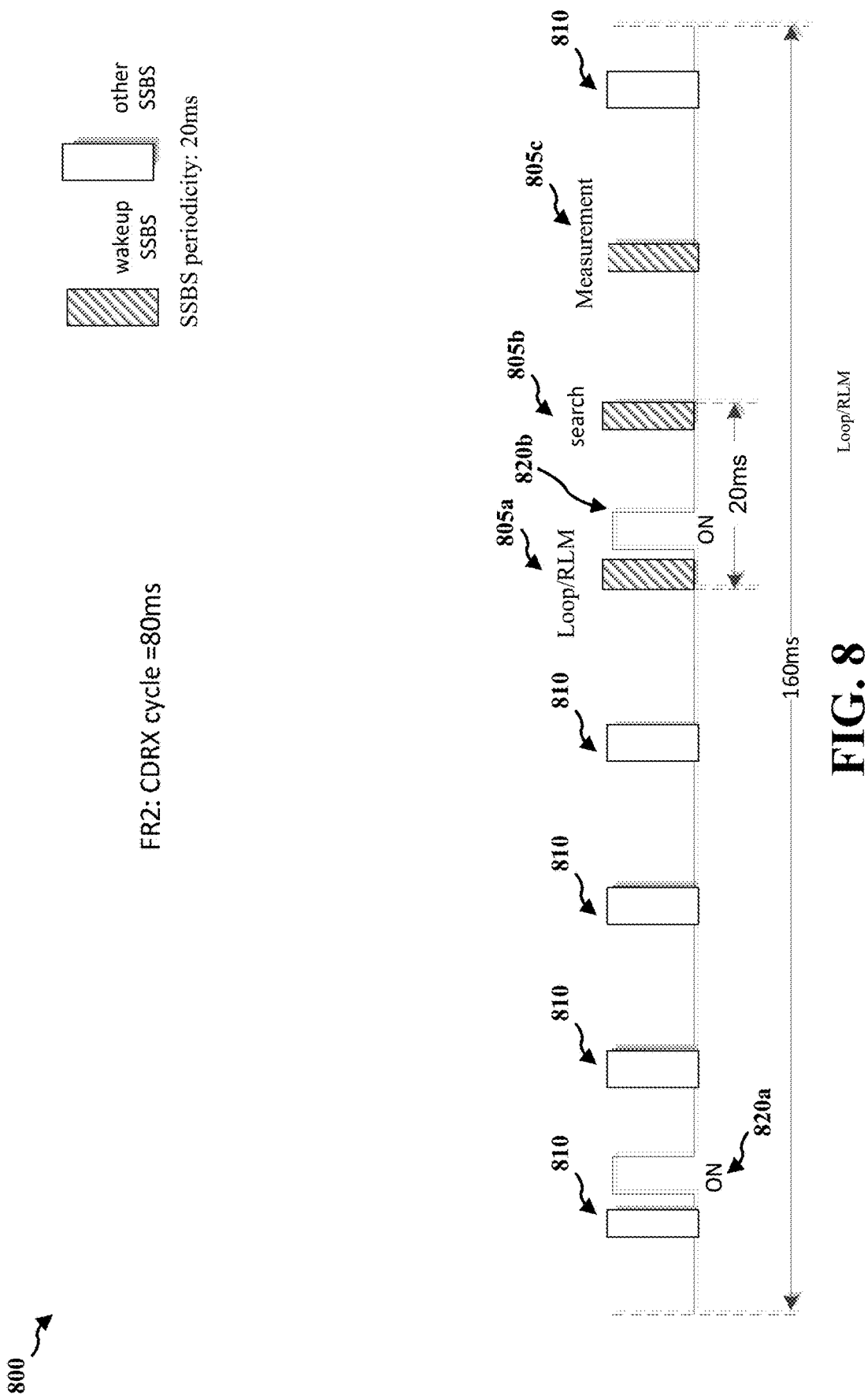

FIGS. 7 and 8 illustrate example schedules 700 and 800, respectively, of SSBS occurrences when multi-tasking is enabled. In the illustrated example, the schedules 700, 800 correspond to a UE operating in FR2. Similar to the example schedule 600 of FIG. 6, the UE may be configured (e.g., based on the periodicity schedule 510 of FIG. 5) to perform the search task every eight CDRX cycles, to perform the measurement task every eight CDRX cycles, to perform the loop tracking task every 160 ms, and to perform the RLM task every 320 ms.

In the illustrated examples of FIGS. 7 and 8, the CDRX cycle has a duration of 80 ms and the SSBS periodicity is 20 ms. Accordingly, each CDRX cycle of the example schedules 700, 800 include four SSBS occurrences. Furthermore, as described above, the UE may discard (or ignore) certain of the SSBS occurrences. Thus, the example schedules 700, 800 illustrate wake-up SSBS occurrences 705, 805 (e.g., SSBS occurrences for which the UE wakes-up for from an OFF duration) and other SSBS occurrences 710, 810 (e.g., SSBS occurrences that the UE ignores).

In the illustrated examples of FIGS. 7 and 8, the UE is operating in FR2. Accordingly, the UE may not perform the search task and another task during the same SSBS occurrence (e.g., the SSBS occurrence during which the UE performs the search task may not be multi-tasked with another one of the tasks). Thus, the UE may perform the search task during a first SSBS occurrence, and may perform the loop tracking task and the RLM task during a second SSBS occurrence that is a different SSBS occurrence than the first SSBS occurrence. In some examples, the UE may also perform the measurement task during the second SSBS occurrence. For example, the UE may compare a measured SINR of a widest serving beam of the UE to an SINR threshold to determine whether to enable a beam refinement mode. In some such examples, when the beam refinement mode is enabled, the UE may perform the measurement task during the third SSBS occurrence. In other examples in which the beam refinement mode is not enabled (or disabled), the UE may perform the measurement task during the second SSBS occurrence (e.g., the UE may perform, during the second SSBS occurrence, the measurement task, the loop tracking task, and the RLM task). Furthermore, to improve the performance of the loop tracking task and irrespective of whether the beam refinement mode is enabled, the UE may select to perform the loop tracking task during an SSBS occurrence that is received during an OFF duration that is closest to the start of an ON duration (and the RLM task).

For example, in the illustrated schedule 700 of FIG. 7, the UE determines not to enable the beam refinement mode and, thus, the UE may select a first wake-up SSBS occurrence 705a during which to perform the measurement task, the loop tracking task, and the RLM task. As shown in the illustrated example, the first wake-up SSBS occurrence 705a is the SSBS occurrence received during the OFF duration and that is closest to and before the start of an ON duration 720b.

Furthermore, the UE may select a second wake-up SSBS occurrence 705b as the first SSBS occurrence to occur after the start of the ON duration 720b. Thus, as shown in the illustrated example of FIG. 7, the UE may wake-up (or transition to the ON state) for the first wake-up SSBS occurrence 705a, the ON duration 720b, and the second wake-up SSBS occurrence 705b, while remaining in the OFF state and ignoring the remaining SSBS occurrences 710 that occur during the two illustrated CDRX cycles of FIG. 7.

Referring to FIG. 8, in the illustrated schedule 800, the UE determines to enable the beam refinement mode and, thus, the UE may select a first wake-up SSBS occurrence 805a for scheduling and performing the loop tracking task and the RLM task (e.g., the UE does not perform the measurement task during the first wake-up SSBS occurrence 805a). As shown in the illustrated example, the first wake-up SSBS occurrence 805a is the SSBS occurrence received during the OFF duration and that is closest to and before the start of an ON duration 820b.

Furthermore, the UE may select a second wake-up SSBS occurrence 805b that corresponds to the first SSBS occurrence to occur after the start of the ON duration 820b. The UE may also select a third wake-up SSBS occurrence 805c that corresponds to the next SSBS occurrence to occur after the second wake-up SSBS occurrence 805b. Thus, as shown in the illustrated example of FIG. 8, the UE may wake-up (or transition to the ON state) for the first wake-up SSBS occurrence 805a, the ON duration 820b, the second wake-up SSBS occurrence 805b, and the third wake-up SSBS occurrence 805c while remaining in the OFF state and ignoring the remaining SSBS occurrences 810 that occur during the two illustrated CDRX cycles of FIG. 8.

Accordingly, by selecting the respective wake-up SSBS occurrences, as shown in the example schedules 700, 800, the UE may be able to benefit from a relatively long sleep state and further conserve power during the CDRX cycle. Furthermore, by selecting the location of the SSBS occurrence during which to perform at least the loop tracking task relatively close to the start of the ON duration (e.g., within a time frame during the OFF duration and before the start of the ON duration), the UE may be able to improve the performance of the loop tracking task by improving the quality of the respective estimates and/or measurements associated with the performing of the loop tracking task. For example, as the first wake-up SSBS occurrences 705a, 805a of FIGS. 7 and 8 are the closest to the start of the respective ON durations, any measurements and/or estimates associated with the performing tracking task may be considered the "freshest" or the most up-to-date for when the UE transitions to the ON state for the ON duration.

While the above description disclosed techniques for facilitating multi-tasking of different OFF duration tasks (e.g., the performing of the search task, the measurement task, the loop tracking task, and the RLM task) and smart location selection of SSBS during a CDRX cycle, the following description discloses additional or alternative scheduling techniques related to the loop tracking tasks.

As described above, the CDRX mode enables a UE to turn off one or more components, such as a receiver, during certain periods (e.g., during an OFF duration of the CDRX cycle) because the UE is not anticipating receiving any communications. While the UE may not receive any communications during the OFF duration, the UE is still expected to maintain certain information and connections with the network. For example, the UE may be configured to periodically perform cell search and measurement tasks (e.g., the searching of any cell resources available to the UE and the measuring of the quality of such resources), beam search and measurement tasks (e.g., the searching of any beam resources available to the UE and the measuring of the quality of such resources), and loop tracking tasks (sometimes referred to as "synchronization loops") (e.g., the synchronizing of AGC loops, TTLs, FTLs, PDP loops, and/or channel estimation loops). The performing of the loop tracking tasks enable the UE to be synchronized with the network when the UE transitions from the OFF state to the ON state during, for example, the ON duration of the CDRX cycle.

Example techniques disclosed herein enable the UE to perform the loop tracking tasks prior to the start of the ON duration so that the UE is ready to be connected at the start of the ON duration.

As described above, synchronization signals are reference signals that may be periodically transmitted by the network and received by the UE. In some examples, the UE may use the synchronization signals received during the OFF duration of a CDRX cycle to perform one or more tasks in preparation for the upcoming ON duration of the CDRX cycle. Furthermore, the network may transmit the synchronization signals regardless of whether any particular UE is in the ON state or waiting for the synchronization signals.

In some examples, the network may also transmit tracking reference signal (TRS) transmissions to the UE. In some such examples, the TRS transmissions may have a different periodicity and/or location than the SSBS transmissions. In some examples, the location of a TRS occurrence may be positioned closer to the start of an ON duration than the location of an SSBS occurrence. For example, the location of a TRS occurrence may be within a first time frame before the start of the ON duration while a location of the SSBS occurrence may be within a second time frame before the start of the ON duration and that is greater than the first time frame. In some examples, the location of the TRS occurrence may be closer to the start of the ON duration relative to the location of the SSBS occurrence.

In some examples, the UE may perform, during an SSBS transmission, search and measurement tasks and loop tracking tasks. In contrast to SSBS transmissions, the UE may perform the loop tracking tasks during the TRS transmission (e.g., may not perform the search and measurement tasks during the TRS transmission).

Figure 9A:
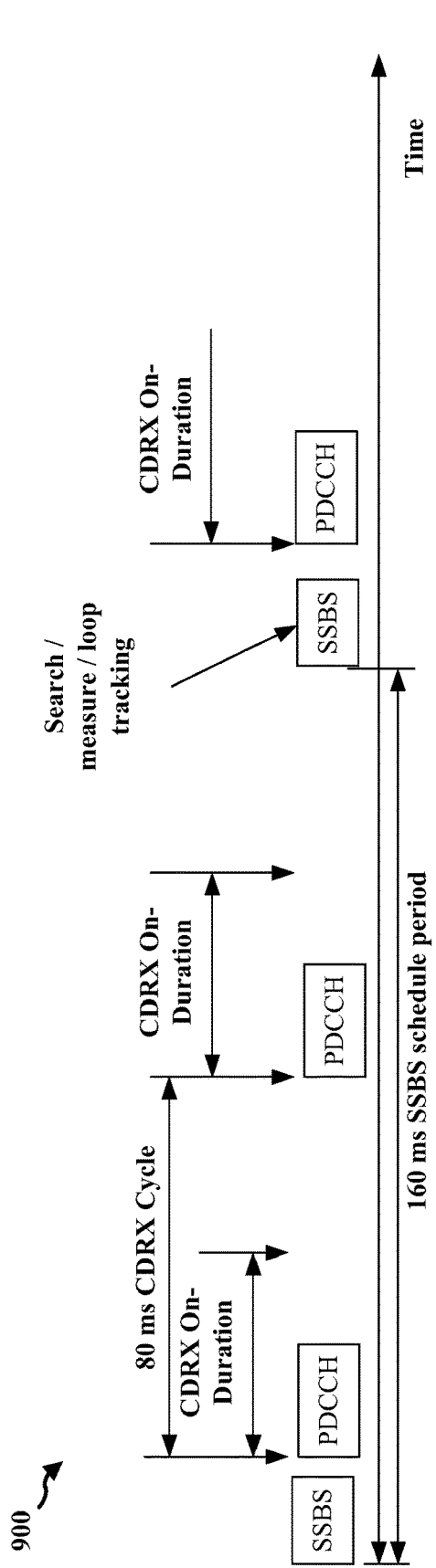
FIG. 9A illustrates a timeline utilizing tracking mode scheduling, in accordance with the teachings disclosed herein.

FIG. 9A illustrates an example timeline 900 utilizing tracking mode scheduling for the scheduling of the loop tracking tasks. In the illustrated example of FIG. 9A, a UE is configured with a predetermined scheduling period for performing the loop tracking tasks. For example, the timeline 900 includes CDRX cycles with an 80 ms period and a predetermined scheduling period of 160 ms for performing the loop tracking tasks.

However, it should be appreciated that increasing the duration of the CDRX cycle may provide improved power savings to the UE. For example, some networks may configure a CDRX cycle for 320 ms or 640 ms. In some examples, increasing the duration of the CDRX cycle may result in an increased likelihood of the UE losing synchronization with the network. For example, if the UE is moving during the OFF duration of the CDRX cycle, the longer duration of the CDRX cycle may result in the UE losing connection with a cell resource and/or a beam resource when the UE does transition to the ON state during the ON duration of the CDRX cycle.

Accordingly, in some examples, the UE may determine an expected sleep duration during a CDRX cycle and determine whether the expected sleep duration is greater than a warm-up threshold. In some such examples, if the expected sleep duration is greater than the warm-up threshold, the UE may switch to a warm-up mode and select an SSBS occurrence within a time frame before the next ON duration during which to perform a search and measurement task and to perform the loop tracking tasks. It should be appreciated that the performing of the search and measurement task may correspond to performing the search task (described above) to identify any cell resources and/or beam resources that may be available to the UE and to performing the measurement task (described above) to measure the quality of any such identified resources.

Figure 9B:
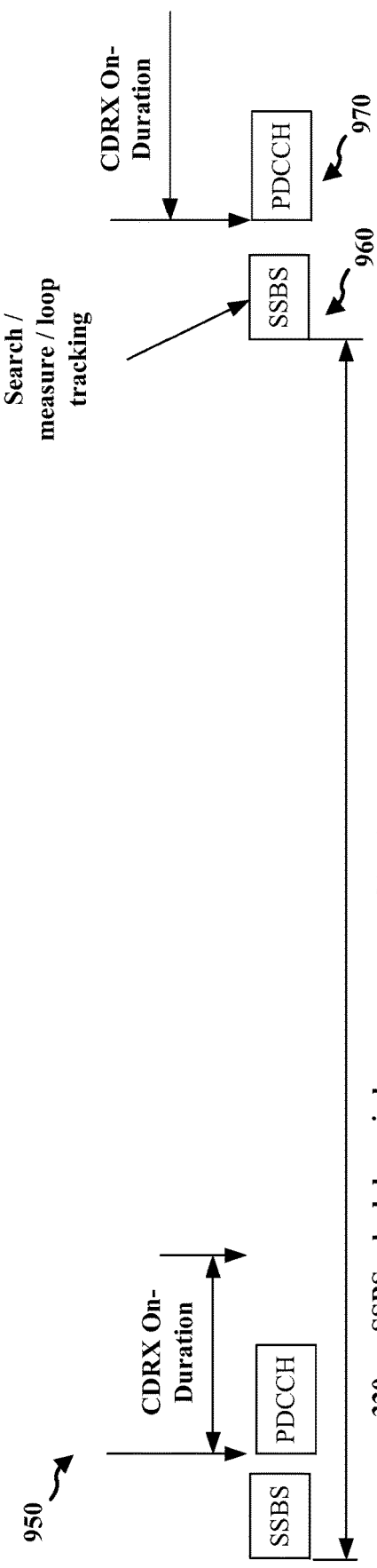
FIG. 9B illustrates a timeline utilizing warm-up mode scheduling, in accordance with the teachings disclosed herein.

FIG. 9B illustrates an example timeline 950 utilizing warm-up mode scheduling for the scheduling of the loop tracking tasks. In the illustrated example of FIG. 9B, a UE is configured with a CDRX cycle having a duration of 320 ms and a warm-up threshold of 160 ms. The UE may determine that there are no selected wake-up occurrences during the OFF duration of the CDRX cycle and, thus, that the expected sleep duration of 320 ms is greater than the warm-up threshold of 160 ms. In some such examples, the UE may transition to the warm-up mode and select a wake-up SSBS occurrence 960 prior to a start of an ON duration 970. In the illustrated example, the UE may perform, during the wake-up SSBS occurrence 960, the search and measurement tasks and the loop tracking tasks (e.g., the performing of the AGC loops, the TTLs, the FTLs, the PDP loops, and/or the channel estimation loops).

Figure 10:
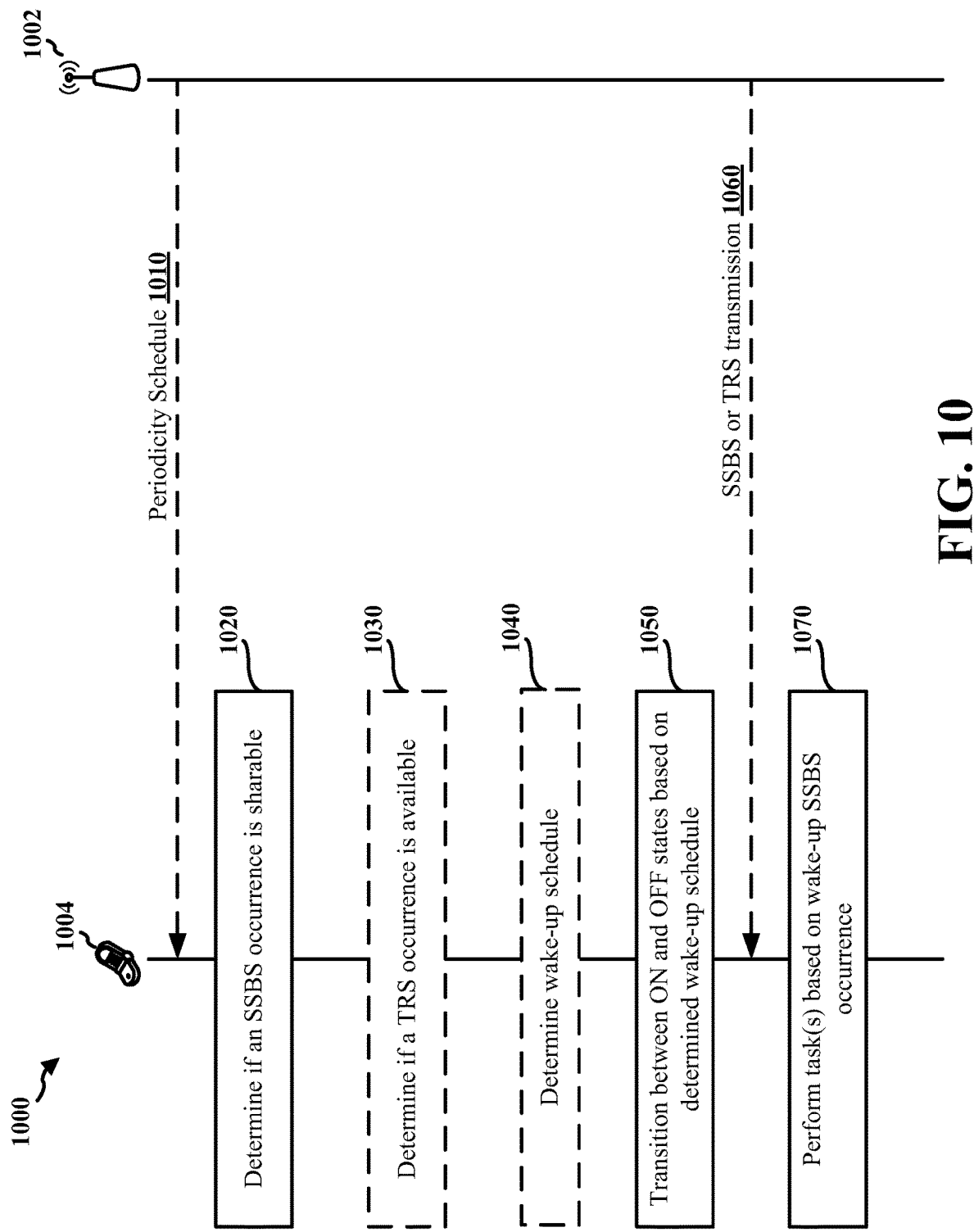
FIG. 10 is another example communication flow between a base station and a UE, in accordance with the teachings disclosed herein.

FIG. 10 illustrates another example of wireless communication 1000 between a base station 1002 and a UE 1004, as presented herein. One or more aspects of the base station 1002 may be implemented by the base station 102/180 of FIG. 1, the base station 310 of FIG. 3, and/or the base station 502 of FIG. 5. One or more aspects of the UE 504 may be implemented by the UE 104 of FIG. 1, the UE 350 of FIG. 3, and/or the UE 504 of FIG. 5.

It should be appreciated that while the wireless communication 1000 includes one base station 1002 in communication with one UE 1004, in additional or alternative examples, the base station 1002 may be in communication with any suitable quantity of UEs 1004 and/or base stations 1002, and/or the UE 1004 may be in communication with any suitable quantity of base stations 1002 and/or UEs 1004. Furthermore, while the wireless communication 1000 includes an example SSBS or TRS transmission 1060, it should be appreciated that in additional or alternative examples, the wireless communication 1000 may include a plurality of SSBS transmissions and/or TRS transmissions that may be transmitted periodically from the base station 1002 to the UE 1004 and/or other UEs.

In the illustrated example of FIG. 10, the base station 1002 may transmit a periodicity schedule 1010 to the UE 1004. The periodicity schedule 1010 may configure the UE 1004 to perform one or more of the tasks based on one or more periods. Furthermore, the periodicity schedule 1010 may indicate to the UE 1004 a CDRX duration and an SSBS periodicity. In some examples, the periodicity schedule 1010 may also indicate to the UE 1004 whether TRS transmissions may be available to the UE 1004 and/or a TRS periodicity. The base station 1002 may transmit the periodicity schedule 1010 via an MIB, via an SIB, via RRC signaling, via DCI signaling, and/or via a MAC-CE.

At 1020, the UE 1004 may determine whether an SSBS occurrence is a sharable SSBS occurrence. As described above, in some examples the UE 1004 may determine that an SSBS occurrence selected during which to perform the loop tracking tasks is an SSBS occurrence that may also be used for performing the search and measurement tasks (e.g., the SSBS occurrence is a shareable SSBS occurrence during which the loop tracking tasks and the search and measurement tasks may be performed). For example, it may be beneficial to reduce the number of SSBS occurrences for which the UE 1004 may wake-up, so identifying a shareable SSBS occurrence may be beneficial to the UE 1004.

In some examples, to determine whether an SSBS occurrence is a shareable SSBS occurrence, the UE 1004 may determine whether signals used for performing the loop tracking tasks can also be used for performing the search and measurement tasks. For example, in some examples, the UE 1004 may be performing search and measurement tasks related to a serving beam and/or cell resource. In some such examples, the UE 1004 may be able to use the serving beam and/or cell resource for performing the search and measurement tasks and the loop tracking tasks and, thus, the UE may determine that the corresponding SSBS occurrence is a sharable SSBS occurrence.

In other examples, the UE 1004 may be performing search and measurement tasks related to, for example, neighboring cell resources and not a serving cell. In some such examples, performing the loop tracking tasks based on the neighboring cell resources may not yield beneficial estimates and/or measurements for maintaining synchronization with a serving cell. Accordingly, in some such examples, when the search and measurement tasks are related to neighboring cell resources, the UE 1004 may determine that the SSBS occurrence selected during which to perform the loop tracking tasks is not a shareable SSBS occurrence (e.g., the UE may not also perform the search and measurement tasks during the selected SSBS occurrence). In some such examples, the UE 1004 may determine to select a first SSBS occurrence during which to perform the loop tracking tasks and may determine to select a second SSBS occurrence during which to perform the search and measurement tasks.

In some examples, whether an SSBS occurrence is a shareable SSBS occurrence may be based on whether the UE 1004 is able to perform the loop tracking tasks in coherence time of a predetermined loop from a previous performing of the loop tracking task. For example, there may be a threshold buffer duration after the completion of the search and measurement tasks and the loop tracking tasks before the UE is able to perform decoding of the downlink transmission (e.g., PDCCH) received during the ON duration. In some example, if the UE 1004 determines that the threshold buffer duration may not be satisfied (e.g., the interval between the completion of the search and measurement tasks and the loop tracking tasks and the start of the decoding of the downlink transmission is not greater than the threshold buffer duration), the UE 1004 may determine that the SSBS occurrence is not a shareable SSBS occurrence (e.g., the SSBS occurrence is a non-sharable SSBS occurrence).

At 1030, the UE 1004 may determine whether a TRS occurrence is available to the UE 1004. In some examples, a TRS occurrence may provide relatively more up-to-date information to the UE 1004 than an SSBS occurrence and, thus, it may be beneficial for the UE 1004 to select the TRS occurrence during which to perform the loop tracking tasks and an SSBS occurrence during which to perform the search and measurement tasks.

For example, as described above, in some examples, the TRS occurrence may be located relatively closer to the start of an ON duration than the SSBS occurrence and, thus, the TRS occurrence may provide relatively "fresher," or more recent, information for performing the loop tracking tasks than the SSBS occurrence. In some such examples, the UE 1004 may determine it may be more beneficial to schedule the performing of the loop tracking tasks during the TRS occurrence.

At 1040, the UE 1004 may determine a wake-up schedule. For example, the UE 1004 may determine the wake-up schedule based on whether an SSBS occurrence is a shareable SSBS occurrence and whether a TRS occurrence is available to the UE 1004. It should be appreciated that the wake-up schedule may correspond to a schedule of selected SSBS occurrences and/or selected TRS occurrences during which the UE wakes-up to perform one or more tasks.

In some examples, when the UE 1004 determines that the SSBS occurrence is a shareable SSBS occurrence, the UE 1004 may select the shareable SSBS occurrence and perform the search and measurement tasks and the loop tracking tasks during the shareable SSBS occurrence.

In some examples, when the UE 1004 determines that the SSBS occurrence is a non-sharable SSBS occurrence, the UE 1004 may select a first SSBS occurrence during which to perform the loop tracking tasks and may select a second SSBS occurrence during which to perform the search and measurement tasks.

In some examples, when the UE 1004 determines that a TRS occurrence is available to the UE 1004, the UE 1004 may also determine whether performing the loop tracking tasks during the TRS occurrence may provide additional power savings than, for example, performing the loop tracking tasks during a shareable SSBS occurrence or multiple SSBS occurrences (e.g., when the SSBS occurrence selected for the performing of the loop tracking tasks is a non-shareable occurrence).

For example, when the UE 1004 determines that the SSBS occurrence selected for the performing of the loop tracking tasks is a non-shareable SSBS occurrence, the UE 1004 may determine whether the TRS occurrence is located relatively closer to the start of the ON duration than the SSBS occurrence. In some such examples, when the UE 1004 determines that the TRS occurrence is located relatively closer than the SSBS occurrence, the UE 1004 may select the TRS occurrence and perform the loop tracking tasks during the TRS occurrence. The UE 1004 may then select an SSBS occurrence during which to perform the search and measurement tasks. In other examples in which the UE 1004 determines that the SSBS occurrence is located relatively closer to the start of the ON duration than the TRS occurrence, the UE 1004 may select a first SSBS occurrence (e.g., the selected SSBS occurrence) during which to perform the loop tracking tasks and may select a second SSBS occurrence during which to perform the search and measurement tasks.

In some examples in which the UE 1004 determines that the SSBS occurrence selected for the performing of the loop tracking tasks is a shareable SSBS occurrence and that a TRS occurrence is available, the UE 1004 may determine to select the TRS occurrence for the performing of the loop tracking tasks when selecting the TRS occurrence saves more power than select the sharable SSBS occurrence for the performing of the loop tracking tasks. For example, the UE 1004 may determine a first duration (D_pre) based on the start of the shareable SSBS occurrence and the start of the TRS occurrence. The UE 1004 may also determine a second duration (D_after) based on the end of the ON duration and the end of an SSBS occurrence located after the start of the ON duration. The UE 1004 may then compare the first duration (D_pre) to the second duration (D_after) and determine that selecting the TRS occurrence for the performing of the loop tracking tasks provides power savings when the first duration (D_pre) is greater than the second duration (D_after).

In some examples, after determining whether to perform the loop tracking tasks and the search and measurement tasks during a shareable SSBS occurrence, a TRS occurrence and an SSBS occurrence, or two SSBS occurrences, the UE 1004 may also determine the locations of the selected SSBS and/or TRS occurrences.

For example, for scheduling and performing the loop tracking tasks, the UE 1004 may select the SSBS occurrence or the TRS occurrence that is located during the OFF duration and that is located closest to the start of an upcoming ON duration.

When selecting the SSBS occurrence for scheduling and performing the search and measurement tasks, the UE 1004 may select the shareable SSBS occurrence when, for example, the TRS occurrence is not available or the TRS occurrence is available but does not provide power savings.

In some examples, the UE 1004 may select the SSBS occurrence for scheduling and performing the search and measurement tasks that is located after the start of the ON duration. In some examples, the start of the selected SSBS occurrence may overlap with the ON duration. In some examples, the start of the selected SSBS occurrence may be located after the end of the ON duration (e.g., there may be an interval between the end of the ON duration and the start of the selected SSBS occurrence). In some such examples, the UE 1004 may cancel (or skip) the transition from the ON state to the OFF state during the interval.

It should be appreciated that the UE 1004 may select the SSBS occurrence for scheduling and performing the search and measurement tasks that is located after the start of the ON duration to increase the power savings. For example, consider an example in which a CDRX duration is 80 ms, an ON duration is 10 ms, and an SSBS periodicity is 20 ms (e.g., during an 80 ms interval, four SSBS occurrences occur). In some such examples, during a 100 ms interval, the UE 1004 may wake-up for a first SSBS occurrence during which to perform the loop tracking tasks, transition to the ON state for the 10 ms of the ON duration, remain in the OFF state for the second and third SSBS occurrences, wake-up for the fourth SSBS occurrence during which to perform the search and measurement tasks, and then wake-up for the fifth SSBS occurrence during which to perform the loop tracking tasks before the next ON duration.

In contrast, in the illustrated example, when the UE 1004 selects the SSBS occurrence that occurs after the start of the ON duration for scheduling and performing the search and measurement tasks, then the UE 1004 may wake-up for a first SSBS occurrence during which to perform the loop tracking tasks, transition to the ON state for the 10 ms of the ON duration, wake-up for the second SSBS occurrence during which to perform the search and measurement tasks, and then remain in the OFF state for the third to fifth SSBS occurrences. Furthermore, in the above example, because the 20 ms interval between the first SSBS occurrence and the second SSBS occurrence is interrupted by the transition to the ON state for the 10 ms of the ON duration, the overall duration that the UE 1004 is in the OFF state during the example CDRX cycle increases, thereby providing increased power savings to the UE 1004 compared to locating the SSBS occurrence for the performing of the search and measurement tasks before the SSBS occurrence selected for the performing of the loop tracking tasks.

At 1050, the UE 1004 may then transition between the ON state and the OFF state based on the wake-up schedule determined at 1040. For example, the UE 1004 may transition to the OFF state to conserve power during an OFF duration of the CDRX cycle. The UE 1004 may then wake-up prior to the occurrence of a selected SSBS or TRS transmission 1060 and based on the wake-up schedule. It should be appreciated that in some examples, the UE 1004 may remain in the OFF state while other SSBS occurrences and/or TRS occurrences may be transmitted by the base station 1002 during the OFF duration of the CDRX cycle.

The UE 1004 may then receive a scheduled SSBS or TRS transmission 1060 while in the ON state. The UE 1004 may then perform, at 1070, one or more task(s) based on the SSBS or TRS transmission 1060. For example, for a shared SSBS occurrence, the UE 1004 may perform the search and measurement tasks and the loop tracking tasks. In other examples, the UE 1004 may perform the loop tracking tasks for an SSBS occurrence or for a TRS occurrence and may perform the search and measurement tasks for a (different) SSBS occurrence.

It should be appreciated that in some examples, the UE 1004 may return to 1050 to continue transitioning between the ON state and the OFF state based on the wake-up schedule.

FIG. 11A illustrates an example timeline 1100 employing the selecting of a shareable SSBS. For example, the UE may select an SSBS occurrence 1110 for scheduling and performing the search and measurement tasks and the loop tracking tasks. In the illustrated example of FIG. 11A, the SSBS occurrence 1110 is selected as the SSBS occurrence within a time frame of the start of an ON duration 1120 (e.g., within 10 ms of the start of the ON duration 1120). For example, the SSBS occurrence 1110 may be located as the closest SSBS occurrence during the OFF duration of the CDRX cycle and before the start of the ON duration 1120. By selecting the SSBS occurrence within the time frame of the start of the ON duration 1120, the UE may be able to improve the quality of the estimates and/or measurements obtained by the performing of the loop tracking tasks.

FIG. 11B illustrates an example timeline 1150 employing the selecting of non-shareable SSBSs. For example the UE may determine that the performing of the search and measurement tasks and the performing of the loop tracking tasks may not be scheduled during the same SSBS occurrence. In the illustrated example of FIG. 11B, the UE may select a first SSBS occurrence 1160*a* for scheduling and performing the loop tracking tasks and may select a second SSBS occurrence 1160*b* for scheduling and performing the search and measurement tasks. Similar to the example timeline 1100 of FIG. 11A, the UE of FIG. 11B may select the first SSBS occurrence 1160 for scheduling and performing the loop tracking tasks as the SSBS occurrence located within a time frame of the start of an ON duration 1170 (e.g., the closest SSBS occurrence during the OFF duration and before the start of the ON duration 1170). The UE may select the second SSBS occurrence 1160*b* corresponding to the SSBS occurrence located after the start of the ON duration 1170. In some examples, the start of the second SSBS occurrence 1160*b* may overlap with the ON duration 1170.

Figure 12A:
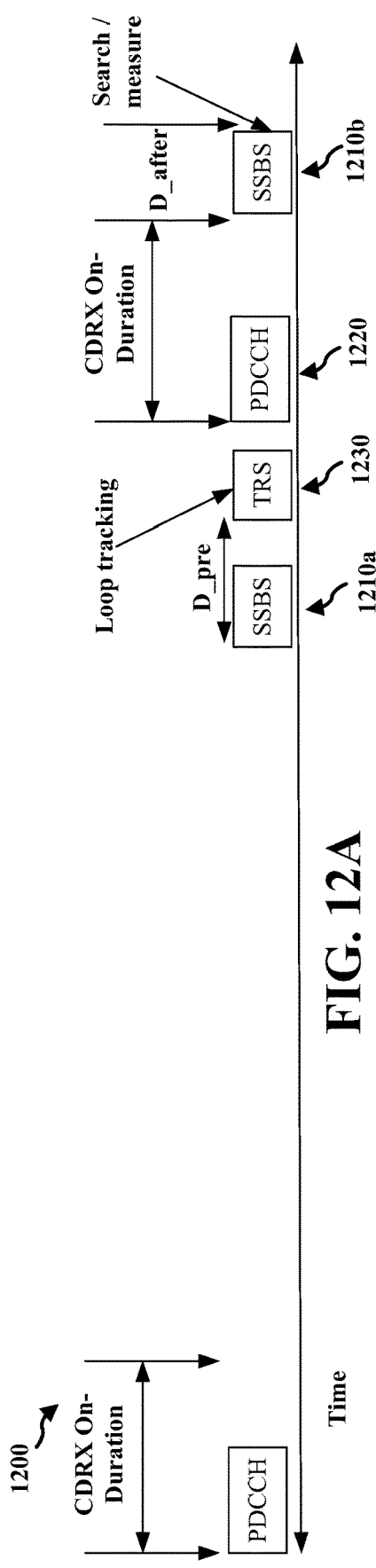
FIG. 12A illustrates a timeline employing selecting of a shareable SSBS and a tracking reference signal (TRS), in accordance with the teachings disclosed herein.

FIG. 12A illustrates an example timeline 1200 employing the selecting of a shareable SSBS when a TRS is available. For example, the UE may determine that the performing of the search and measurement tasks and the performing of the loop tracking tasks may be scheduled during the same SSBS occurrence. In the illustrated example of FIG. 12A, the UE may also determine that a TRS occurrence is available and, thus, may be selected for the scheduling and performing of the loop tracking tasks.

For example, in the illustrated timeline 1200 of FIG. 12, the UE may identify a first SSBS occurrence 1210*a* that is located within a time frame of the start of an ON duration 1220 and a second SSBS occurrence 1210*b* that is located after the start of the ON duration 1220. The UE may also determine that a TRS occurrence 1230 is available to the UE for performing the loop tracking tasks.

In some examples, to determine whether to select the TRS occurrence 1230 for the scheduling and performing of the loop tracking tasks, the UE may determine whether a first duration (D_pre) between the start of the first SSBS occurrence 1210*a* and the start of the TRS occurrence 1230 is greater than a second duration (D_after) between the end of the ON duration 1220 and the end of the second SSBS occurrence 1210*b*. In some such examples, when the first duration (D_pre) is greater than the second duration (D_after), the UE may select the TRS occurrence 1230 for the scheduling and performing of the loop tracking tasks. The UE may then select the second SSBS occurrence 1210 for the scheduling and performing of the search and measurement tasks. While the second SSBS occurrence 1210 of FIG. 12A is located after the start of the ON duration 1220, it should be appreciated that in other examples, the second SSBS occurrence 1210 may be located at any position after the TRS occurrence 1230.

It should be appreciated that in other examples in which the first duration (D_pre) is not greater than the second duration (D_after), the UE may determine to select the first SSBS occurrence 1210*a* for scheduling and performing the search and measurement tasks and the loop tracking tasks (as described above in connection with the example timeline 1100 of FIG. 11A).

Figure 12B:
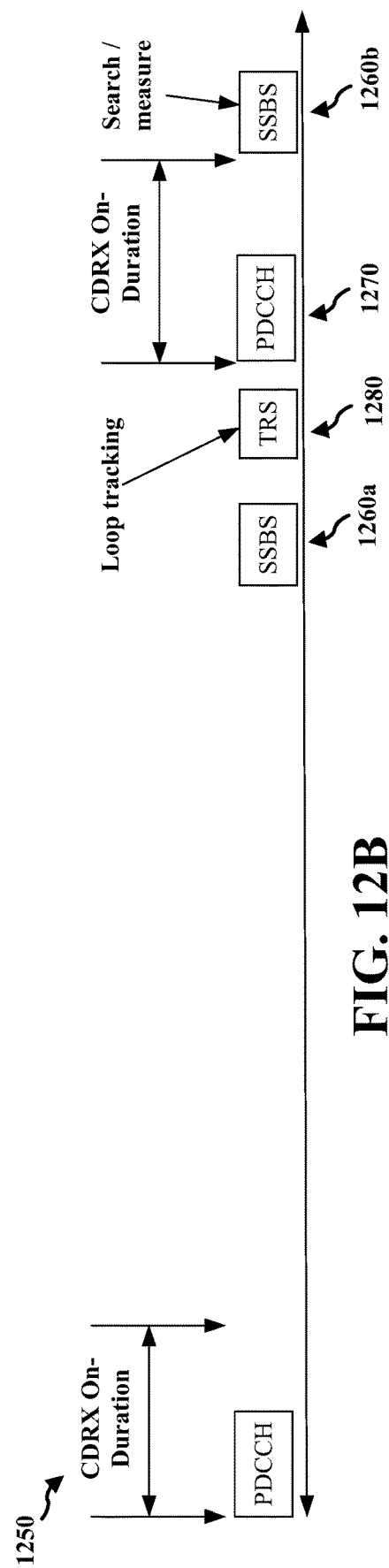
FIG. 12B illustrates a timeline employing selecting of non-shareable SSBSs and a TRS, in accordance with the teachings disclosed herein.

FIG. 12B illustrates an example timeline 1250 employing the selecting of non-shareable SSBSs when a TRS is available. For example the UE may determine that the performing of the search and measurement tasks and the performing of the loop tracking tasks may not be performed during the same SSBS occurrence. In the illustrated example of FIG. 12B, the UE may also determine that a TRS occurrence is available and, thus, may be selected for scheduling and performing of the loop tracking tasks.

In the illustrated example timeline 1250 of FIG. 12B, the UE may identify a first SSBS occurrence 1260a that is located within a time frame of the start of an ON duration 1270 and a second SSBS occurrence 1260b that is located after the start of the ON duration 1270. The UE may also determine that a TRS occurrence 1280 is available to the UE for performing the loop tracking tasks.

In the illustrated example, when the UE determines to select non-sharable SSBS occurrences and that a TRS occurrence is available, the UE may then compare the locations of the first SSBS occurrence 1260a and the TRS occurrence 1280 relative to the start of the ON duration 1270. For example, as shown in FIG. 12B, the TRS occurrence 1280 is located closer to the start of the ON duration 1270 than the first SSBS occurrence 1260a. As the UE determines to select non-sharable SSBS occurrences, the UE may select the TRS occurrence 1280 for scheduling and performing the loop tracking tasks and may select the second SSBS occurrence 1260b for scheduling and performing the search and measurement tasks. In some examples, the start of the second SSBS occurrence 1260b may overlap with the ON duration 1270. While the second SSBS occurrence 1260b of FIG. 12B is located after the start of the ON duration 1270, it should be appreciated that in other examples, the second SSBS occurrence 1260b may be located at any position after the TRS occurrence 1280.

It should be appreciated that in other examples, the first SSBS occurrence may be located closer to the start of the ON duration than the TRS occurrence. In some such examples, the UE may select the first SSBS occurrence for scheduling and performing the loop tracking tasks and may select the second SSBS occurrence for scheduling and performing the search and measurement tasks (as described above in connection with the example timeline 1150 of FIG. 11B). Thus, it should be appreciated that after determining to utilize non-sharable SSBS occurrences, the UE may select the "fresher" of the TRS occurrence and the first SSBS occurrence for scheduling and performing the loop tracking tasks.

In some examples, when the UE selects an SSBS occurrence after the start of an ON duration for scheduling and performing the search and measurement tasks, as shown above in connection with the example timelines 1150, 1200, 1250 of FIGS. 11B, 12A, and 12B, respectively, the UE may determine to skip transitioning to the OFF state during the period between the end of the ON duration and the start of the second SSBS occurrence.

It should be appreciated that while the above examples describe a single SSBS occurrence and/or a single TRS occurrence located prior to the start of an ON duration for the scheduling and performing of one or more tasks, in other examples, any suitable quantity of SSBS occurrences and/or TRS occurrences (e.g., two occurrences, three occurrences, etc.) may be selected for the scheduling and performing of the one or more tasks. For example, in some examples, the UE may select a plurality of SSBS occurrences prior to the start of an ON duration for scheduling and performing the one or more tasks.

Figure 13:
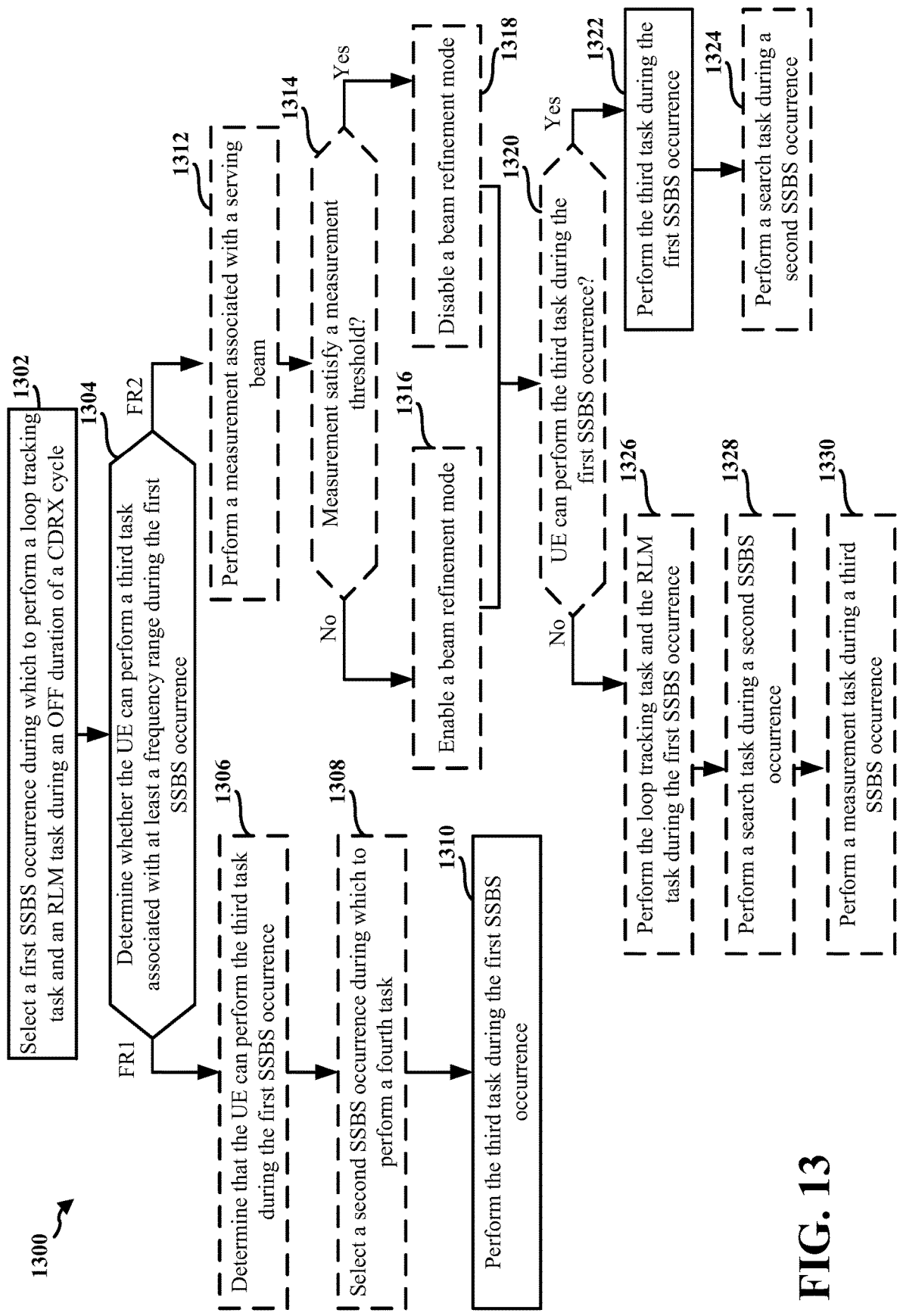
FIGS. 13 and 14 are flowcharts of example methods of wireless communication at a UE, in accordance with the teachings disclosed herein.

FIG. 13 is a flowchart 1300 of a method of wireless communication. The method may be performed by a UE (e.g., the UE 104, the UE 350, the UE 504, the UE 1004, the apparatus 1502/1502', and/or the processing system 1614, which may include the memory 360 and which may be the entire UE 350 or a component of the UE 350, such as the TX processor 368, the RX processor 356, and/or the controller/processor 359). Optional aspects are illustrated with a dashed line. The method may improve power efficiency of a UE operating in the CDRX mode by reducing the number of wake-up SSBS occurrences and/or by increasing the duration during which the UE is in the OFF state.

At 1302, the UE may select a first SSBS occurrence during which to perform a loop tracking task and an RLM task during an OFF duration of a CDRX cycle. For example, an SSBS occurrence selection component 1508 of apparatus 1502 may facilitate the selecting of the first SSBS occurrence during which to perform the loop tracking task and the RLM task. In some examples, the first SSBS occurrence may be located within a first time frame of a start of an ON duration of the CDRX cycle.

At 1304, the UE may determine whether the UE can perform a third task associated with at least a frequency range during the first SSBS occurrence. For example, a capability determining component 1510 may facilitate the determining of whether the UE can perform the third task during the first SSBS occurrence. In some examples, whether the UE may perform the third task during the first SSBS occurrence may depend on whether the UE is operating in the sub-6 GHz frequency range (FR1) or the millimeter wave frequency range (FR2). In some examples, whether the UE may perform the third task during the first SSBS occurrence may depend on whether the UE is performing beam scheduling.

If, at 1304, the UE determines that the UE is operating in FR1, then, at 1306, the UE may determine that the UE can perform the third task during the first SSBS occurrence. For example, the capability determining component 1510 may facilitate the determining that the UE can perform the third task during the first SSBS occurrence when the UE is operating in FR1.

At 1308, the UE may select a second SSBS occurrence during which to perform a fourth task. For example, the SSBS occurrence selection component 1508 may facilitate the selecting of the second SSBS occurrence during which to perform the fourth task.

At 1310, the UE may perform the third task during the first SSBS occurrence. For example, a task performing component 1512 may facilitate the performing of the third task during the first SSBS occurrence. In some examples, the third task may be one of a measurement task or a search task, and the fourth task may be the other one of the measurement task or the search task.

If, at 1304, the UE determined that the UE was operating in FR2, then, at 1312, the UE may perform a measurement associated with a serving beam. For example, a measurement handling component 1514 may facilitate the performing of the measurement associated with the serving beam. In some examples, the measurement may be an SINR measurement associated with the serving beam. In some examples, the serving beam may be a widest beam serving the UE (e.g., transmitted on a widest frequency range beam serving the UE).

At 1314, the UE may determine whether the measurement satisfies a measurement threshold. For example, the measurement handling component 1514 may facilitate the determining of whether the measurement satisfies the measurement threshold.

If, at 1314, the UE determines that the measurement does not satisfy the measurement threshold, then, at 1316, the UE may enable a beam refinement mode. For example, the measurement handling component 1514 may facilitate the enabling of the beam refinement mode. Control may then proceed to 1320 to determine whether the UE can perform the third task during the first SSBS occurrence.

If, at 1314, the UE determines that the measurement satisfies the measurement threshold, then, at 1318, the UE may disable the beam refinement mode. For example, the measurement handling component 1514 may facilitate the disabling of the beam refinement mode. Control may then proceed to 1320 to determine whether the UE can perform the third task during the first SSBS occurrence.

At 1320, the UE may determine whether the UE can perform the third task during the first SSBS occurrence while the UE is operating in FR2. For example, the capability determining component 1510 may facilitate the determining of whether the UE can perform the third task during the first SSBS occurrence while the UE is operating in FR2. In some examples, the UE may determine that the UE can perform the third task during the first SSBS occurrence based on a determination that the beam refinement mode is disabled. In some examples, the UE may determine that the UE cannot perform the third task during the first SSBS occurrence based on a determination that the beam refinement mode is enabled.

It, at 1320, the UE determined that the UE can perform the third task during the first SSBS occurrence, then, at 1322, the UE may perform the third task during the first SSBS occurrence. For example, the task performing component 1512 may facilitate the performing of the third task during the first SSBS occurrence. It should be appreciated that the UE may also perform the loop tracking task and the RLM task during the first SSBS occurrence.

At 1324, the UE may perform a search task during a second SSBS occurrence. For example, the task performing component 1512 may facilitate the performing of the search task during the second SSBS occurrence. In some examples, the second SSBS occurrence may be located at a first SSBS occurrence after the start of the ON duration.

If, at 1320, the UE determines that the UE is unable to perform the third task during the first SSBS occurrence, then, at 1326, the UE may perform the loop tracking task and the RLM task during the first SSBS occurrence. For example, the task performing component 1512 may facilitate the performing of the loop tracking task and the RLM task during the first SSBS occurrence.

At 1328, the UE may perform a search task during a second SSBS occurrence. For example, the task performing component 1512 may facilitate the performing of the search task during the second SSBS occurrence. In some examples, the second SSBS occurrence may be located at a first SSBS occurrence after the start of the ON duration.

At 1330, the UE may perform a measurement task during a third SSBS occurrence. For example, the task performing component 1512 may facilitate the performing of the measurement task during the third SSBS occurrence. In some examples, the second SSBS occurrence may be located at a first SSBS occurrence after the start of the ON duration. In some examples, the third SSBS occurrence may be located after the second SSBS occurrence.

Figure 14:
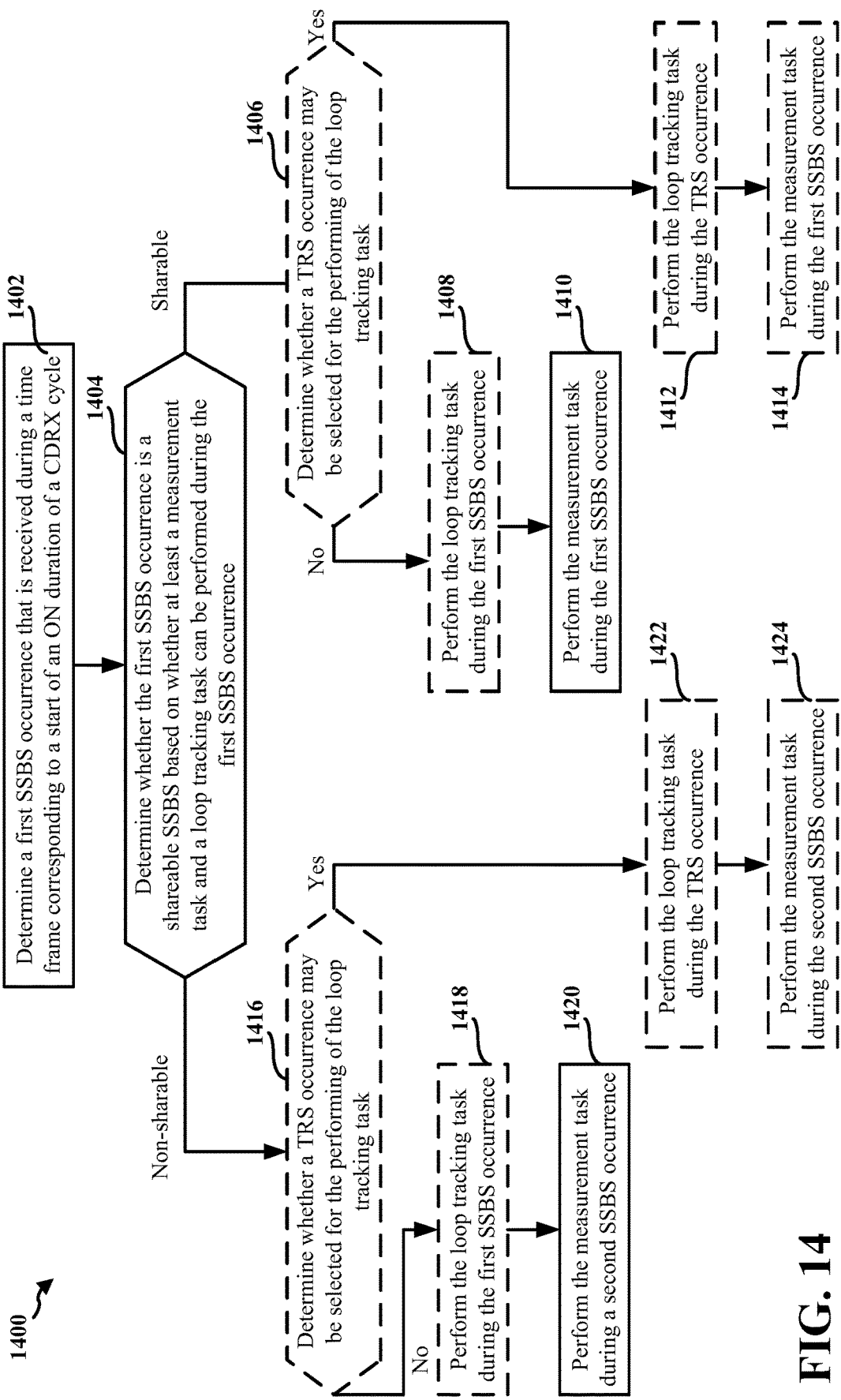

FIG. 14 is a flowchart 1400 of a method of wireless communication. The method may be performed by a UE (e.g., the UE 104, the UE 350, the UE 504, the UE 1004, the apparatus 1502/1502', and/or the processing system 1614, which may include the memory 360 and which may be the entire UE 350 or a component of the UE 350, such as the TX processor 368, the RX processor 356, and/or the controller/processor 359). Optional aspects are illustrated with a dashed line. The method may improve the power efficiency of a UE operating in the CDRX mode by identifying sharable SSBS occurrence and thereby reducing the number of wake-up SSBS occurrences and/or by increasing the duration during which the UE is in the OFF state.

At 1402, the UE may determine a first SSBS occurrence that is received during a time frame corresponding to a start of an ON duration of a CDRX cycle. For example, the SSBS occurrence selection component 1508 of the apparatus 1502 may facilitate the determining of the first SSBS occurrence that is located within a time frame of a start of an ON duration of a CDRX cycle.

At 1404, the UE may determine whether the first SSBS occurrence is a shareable SSBS based on whether at least a measurement task and a loop tracking task can be performed during the first SSBS occurrence. For example, a sharable handling component 1516 may facilitate the determining of whether the first SSBS occurrence is a sharable SSBS.

If, at 1404, the UE determines that the first SSBS occurrence is a sharable SSBS, then, at 1406, the UE may determine whether a TRS occurrence may be selected for the performing of the loop tracking task. For example, a TRS handling component 1518 may facilitate the determining of whether a TRS occurrence may be selected for the performing of the loop tracking task. In some examples, the UE may determine that the TRS occurrence is selectable for the performing of the loop tracking task when the TRS occurrence is located closer to the start of the ON duration relative to the first SSBS occurrence.

If, at 1406, the UE determines that the TRS occurrence is not usable (or that there is not a TRS occurrence available), then, at 1408, the UE may perform the loop tracking task during the first SSBS occurrence. For example, the task performing component 1512 may facilitate the performing of the loop tracking task during the first SSBS occurrence.

At 1410, the UE may perform the measurement task during the first SSBS occurrence. For example, the task performing component 1512 may facilitate the performing of the measurement task during the first SSBS occurrence.

If, at 1406, the UE determines that the TRS occurrence is selectable (e.g., for the performing of the loop tracking task), then, at 1412, the UE may perform the loop tracking task during the TRS occurrence. For example, the task performing component 1512 may facilitate the performing of the loop tracking task during the TRS occurrence.

At 1414, the UE may perform the measurement task during the first SSBS occurrence. For example, the task performing component 1512 may facilitate the performing of the measurement task during the first SSBS occurrence.

If, at 1404, the UE determines that the first SSBS occurrence is a non-sharable SSBS, then, at 1416, the UE may determine whether a TRS occurrence may be selected for the performing of the loop tracking task. For example, the TRS handling component 1518 may facilitate the determining of whether a TRS occurrence may be selected for the performing of the loop tracking task. In some examples, the UE may determine that the TRS occurrence is selectable for the performing of the loop tracking task when the TRS occurrence is located closer to the start of the ON duration relative to the first SSBS occurrence.

If, at 1416, the UE determines that the TRS occurrence is not selectable (or that there is not a TRS occurrence available), then, at 1418, the UE may perform the loop tracking task during the first SSBS occurrence. For example, the task performing component 1512 may facilitate the performing of the loop tracking task during the first SSBS occurrence.

At 1420, the UE may perform the measurement task during a second SSBS occurrence. For example, the task performing component 1512 may facilitate the performing of the measurement task during the second SSBS occurrence. In some examples, the second SSBS occurrence may be located after the start of the ON duration of the CDRX cycle.

If, at 1416, the UE determines that the TRS occurrence is selectable (e.g., for the performing of the loop tracking task), then, at 1422, the UE may perform the loop tracking task during the TRS occurrence. For example, the task performing component 1512 may facilitate the performing of the loop tracking task during the TRS occurrence.

At 1424, the UE may perform the measurement task during the second SSBS occurrence. For example, the task performing component 1512 may facilitate the performing of the measurement task during the second SSBS occurrence. In some examples, the second SSBS occurrence may be located after the TRS occurrence.

Figure 15:
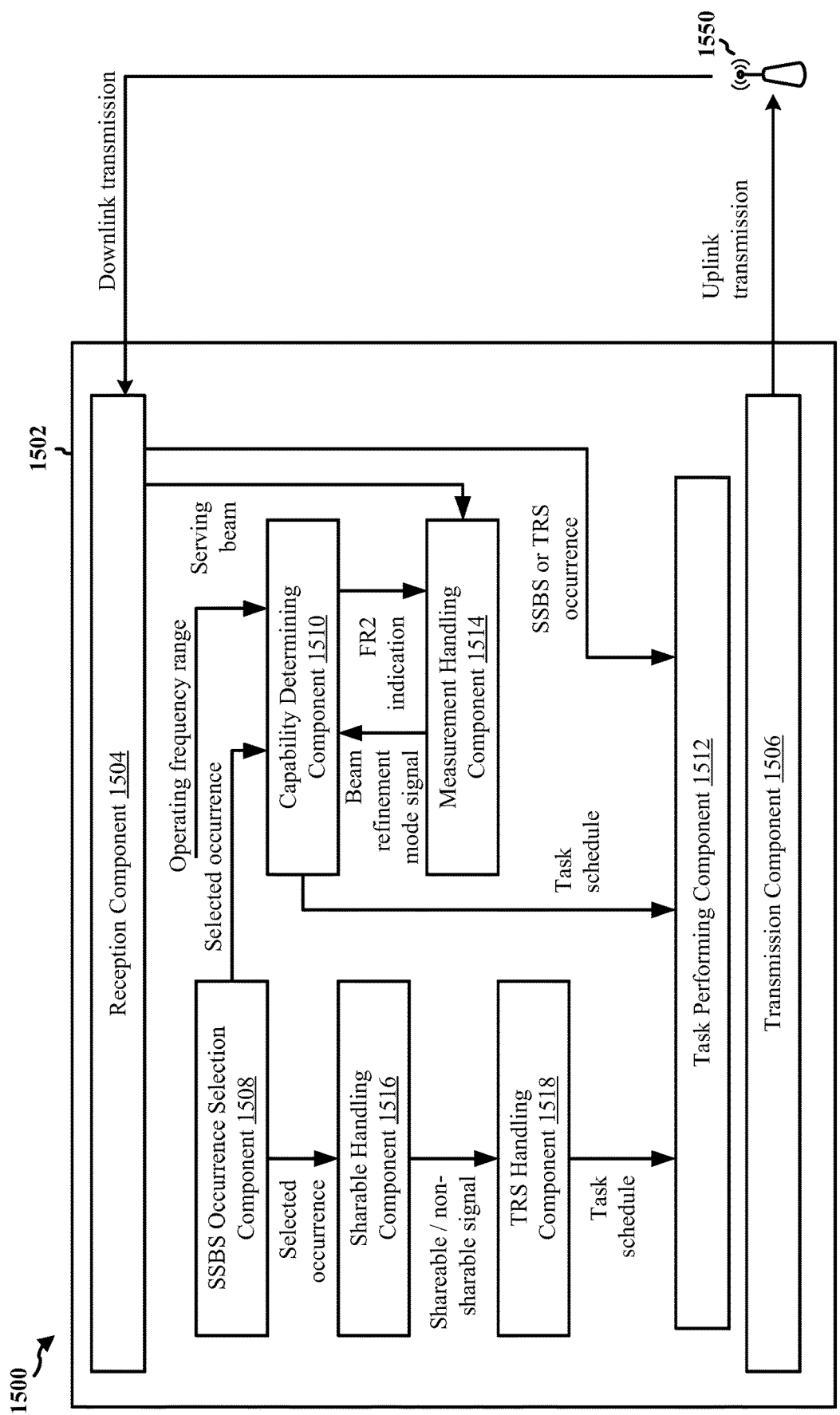
FIG. 15 is a conceptual data flow diagram illustrating the data flow between different means/components in an example apparatus.

FIG. 15 is a conceptual data flow diagram 1500 illustrating the data flow between different means/components in an example apparatus 1502 in communication with a base station 1550. The apparatus 1502 may be a UE. The apparatus 1502 may perform the methods of flowcharts 1300 and/or 1400. The apparatus 1502 includes a reception component 1504, a transmission component 1506, an SSBS occurrence selection component 1508, a capability determining component 1510, a task performing component 1512, a measurement handling component 1514, a sharable handling component 1516, and a TRS handling component 1518.

The reception component 1504 may be configured to receive various types of signals/messages and/or other information from other devices including the base station 1550. The messages/information may be received via the reception component 1504 and provided to one or more components of the apparatus 1502 for further processing and use in performing various operations. For example, the reception component 1504 may be configured to receive signaling including receiving a periodicity schedule, an SSBS occurrence, and/or a TRS occurrence.

The transmission component 1506 may be configured to transmit an uplink transmission to, for example, the base station 1550.

The SSBS occurrence selection component 1508 may be configured to select a first SSBS occurrence during which to perform a loop tracking task and an RLM task during an OFF duration of a CDRX cycle, to select a second SSBS occurrence during which to perform a fourth task, and/or to determine a first SSBS occurrence that is received during a time frame corresponding to a start of an ON duration of a CDRX cycle of the UE (e.g., as described in connection with 1302, 1308, and/or 1402).

The capability determining component 1510 may be configured to determine whether the UE can perform a third task during the first SSBS occurrence (e.g., as described in connection with 1304, 1306, and/or 1320).

The task performing component 1512 may be configured to perform the third task during the first SSBS occurrence, to perform a search task during a second SSBS occurrence, to perform the loop tracking task and the RLM task during the first SSBS occurrence, to perform a measurement task during a third SSBS occurrence, to perform the loop tracking task during the first SSBS occurrence, to perform the measurement task during the first SSBS occurrence, to perform the loop tracking task during the TRS occurrence, and/or to perform the measurement task during a second SSBS occurrence (e.g., as described in connection with 1310, 1320, 1324, 1326, 1328, 1330, 1408, 1410, 1412, 1414, 1418, 1420, 1422, and/or 1424).

The measurement handling component 1514 may be configured to perform a measurement associated with a serving beam, to determine whether the measurement satisfies a measurement threshold, to enable a beam refinement mode, and/or to disable a beam refinement mode (e.g., as described in connection with 1312, 1314, 1316, and/or 1318).

The sharable handling component 1516 may be configured to determine whether the first SSBS occurrence is a shareable SSBS based on whether at least a measurement task and a loop tracking task can be performed during the first SSBS occurrence (e.g., as described in connection with 1404).

The TRS handling component 1518 may be configured to determine whether a TRS occurrence is selectable for the performing of the loop tracking task (e.g., as described in connection with 1406 and/or 1416).

The apparatus may include additional components that perform each of the blocks of the algorithm in the aforementioned flowcharts of FIGS. 13 and/or 14. As such, each block in the aforementioned flowcharts of FIGS. 13 and/or 14 may be performed by a component and the apparatus may include one or more of those components. The components may be one or more hardware components specifically configured to carry out the stated processes/algorithm, implemented by a processor configured to perform the stated processes/algorithm, stored within a computer-readable medium for implementation by a processor, or some combination thereof.

Figure 16:
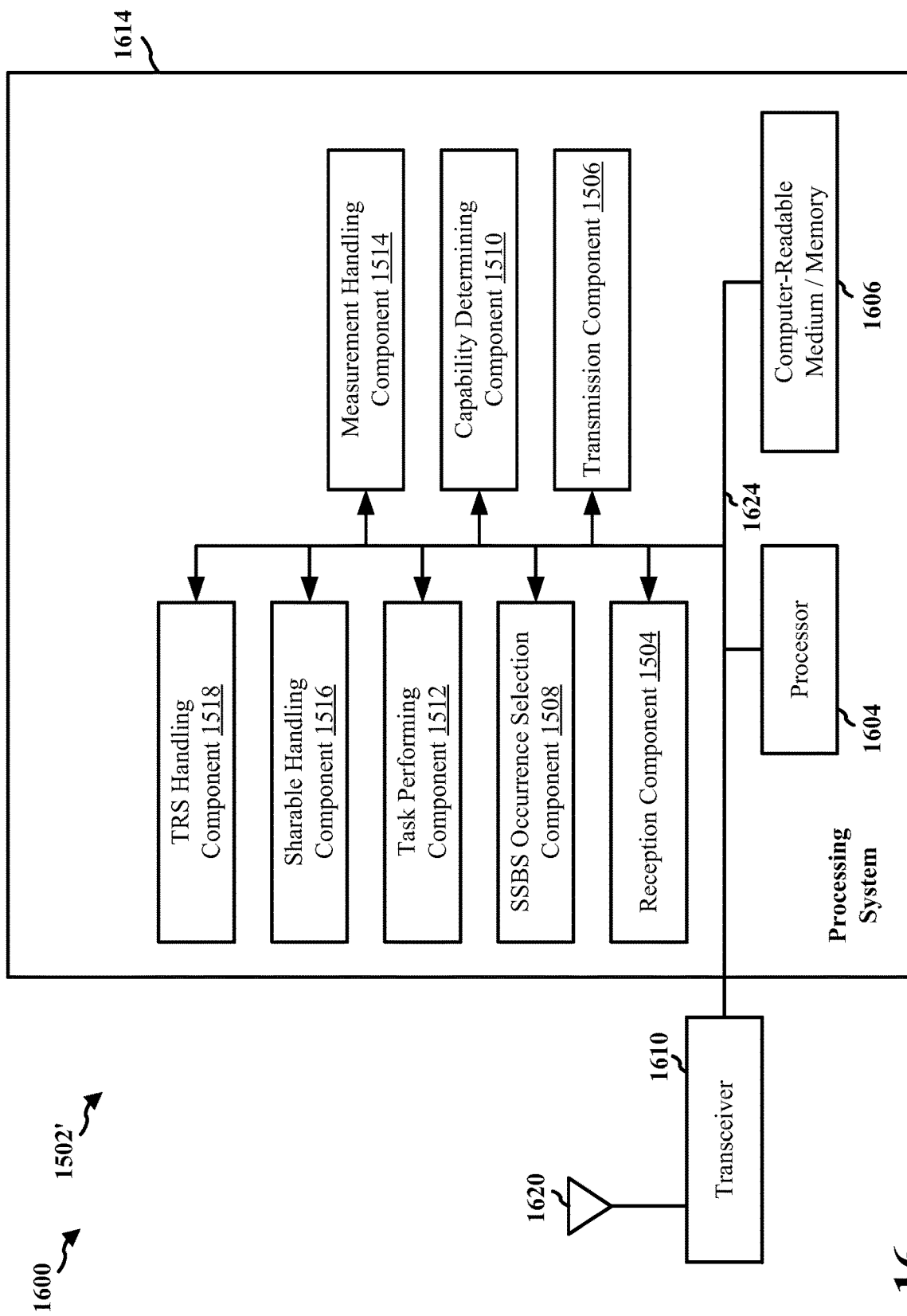
FIG. 16 is a diagram illustrating an example of a hardware implementation for an apparatus employing a processing system.

FIG. 16 is a diagram 1600 illustrating an example of a hardware implementation for an apparatus 1502' employing a processing system 1614. The processing system 1614 may be implemented with a bus architecture, represented generally by the bus 1624. The bus 1624 may include any number of interconnecting buses and bridges depending on the specific application of the processing system 1614 and the overall design constraints. The bus 1624 links together various circuits including one or more processors and/or hardware components, represented by the processor 1604, the components 1504, 1506, 1508, 1510, 1512, 1514, 1516, 1518, and the computer-readable medium/memory 1606. The bus 1624 may also link various other circuits such as timing sources, peripherals, voltage regulators, and power management circuits, which are well known in the art, and therefore, will not be described any further.

The processing system 1614 may be coupled to a transceiver 1610. The transceiver 1610 is coupled to one or more antennas 1620. The transceiver 1610 provides a means for communicating with various other apparatus over a transmission medium. The transceiver 1610 receives a signal from the one or more antennas 1620, extracts information from the received signal, and provides the extracted information to the processing system 1614, specifically the reception component 1504. In addition, the transceiver 1610 receives information from the processing system 1614, specifically the transmission component 1506, and based on the received information, generates a signal to be applied to the one or more antennas 1620. The processing system 1614 includes a processor 1604 coupled to a computer-readable medium/memory 1606. The processor 1604 is responsible for general processing, including the execution of software stored on the computer-readable medium/memory 1606. The software, when executed by the processor 1604, causes the processing system 1614 to perform the various functions described supra for any particular apparatus. The computer-readable medium/memory 1606 may also be used for storing data that is manipulated by the processor 1604 when executing software. The processing system 1614 further includes at least one of the components 1504, 1506, 1508, 1510, 1512, 1514, 1516, 1518. The components may be software components running in the processor 1604, resident/stored in the computer readable medium/memory 1606, one or more hardware components coupled to the processor 1604, or some combination thereof. The processing system 1614 may be a component of the UE 350 and may include the memory 360 and/or at least one of the TX processor 368, the RX processor 356, and/or the controller/processor 359. Alternatively, the processing system 1614 may be the entire UE (e.g., see the UE 350 of FIG. 3).

In one configuration, the apparatus 1502/1502' for wireless communication may include means for selecting a first SSBS occurrence during which to perform a loop tracking task and an RLM task during an OFF duration of a CDRX cycle. The apparatus may include means for determining whether the UE can perform a third task associated with at least a frequency range during the first SSBS occurrence. The apparatus may include means performing the third task associated with the at least a frequency range during the first SSBS occurrence. The apparatus may include means for selecting a second SSBS occurrence during which to perform a fourth task. The apparatus may include means for performing a measurement associated with a serving beam. The apparatus may include means for enabling a beam refinement mode when the measurement satisfies a measurement threshold. The apparatus may include means for disabling the beam refinement mode when the measurement does not satisfy the measurement threshold. The apparatus may include means for determining that the UE can perform the third task during the first SSBS occurrence when the beam refinement mode is disabled. The apparatus may include means for performing a search task during the second SSBS occurrence. The apparatus may include means for performing the loop tracking task and the RLM task during the first SSBS occurrence after a determination that the UE is unable to perform the third task during the first SSBS occurrence. The apparatus may include means for performing a search task during the second SSBS occurrence. The apparatus may include means for performing a measurement task during a third SSBS occurrence received after the second SSBS occurrence. The apparatus may include means for determining a first SSBS occurrence that is received during a time frame corresponding to a start of an ON duration of a CDRX cycle. The apparatus may include means for determining whether the first SSBS occurrence is a shareable SSBS based on whether the UE can perform at least a measurement task and a loop tracking task during the first SSBS occurrence. The apparatus may include means for performing the measurement task during the first SSBS occurrence when the first SSBS occurrence is the shareable SSBS. The apparatus may include means for performing the measurement task during a second SSBS occurrence when the first SSBS occurrence is a non-shareable SSBS, the second SSBS occurrence being different than the first SSBS occurrence. The apparatus may include means for performing the loop tracking task during the first SSBS occurrence when the first SSBS occurrence is the shareable SSBS, and where the first SSBS occurrence is a last SSBS occurrence received before the start of the ON duration of the CDRX cycle. The apparatus may include means for performing the loop tracking task during the first SSBS occurrence when the first SSBS occurrence is the non-shareable SSBS, the first SSBS occurrence being a last SSBS occurrence received before the start of the ON duration of the CDRX cycle, and where the second SSBS occurrence is received after the start of the ON duration of the CDRX cycle. The apparatus may include means for determining whether the UE can perform the loop tracking task during a TRS occurrence based on whether the TRS occurrence is received between an SSBS occurrence received during an OFF duration of a previous CDRX cycle and the start of the ON duration of the CDRX cycle. The apparatus may include means for performing the loop tracking task during the TRS occurrence when the TRS occurrence is usable.

The aforementioned means may be one or more of the aforementioned components of the apparatus 1502 and/or the processing system 1614 of the apparatus 1502' configured to perform the functions recited by the aforementioned means. As described supra, the processing system 1614 may include the TX Processor 368, the RX Processor 356, and the controller/processor 359. As such, in one configuration, the aforementioned means may be the TX Processor 368, the RX Processor 356, and/or the controller/processor 359 configured to perform the functions recited by the aforementioned means.

Example techniques disclosed herein facilitate reducing the number of times a UE operating in a CDRX mode may wake-up to receive a reference signal, such as SSBS, and, thereby, enable the UE to improve power efficiency while operating in the CDRX mode. Furthermore, example techniques disclosed herein facilitate smart location selection of the received reference signals, thereby enabling the UE to increase the OFF duration during a CDRX cycle and, thus, reduce power consumption while operating the CDRX mode.

It is understood that the specific order or hierarchy of blocks in the processes/flowcharts disclosed is an illustration of example approaches. Based upon design preferences, it is understood that the specific order or hierarchy of blocks in the processes/flowcharts may be rearranged. Further, some blocks may be combined or omitted. The accompanying method claims present elements of the various blocks in a sample order, and are not meant to be limited to the specific order or hierarchy presented.

The previous description is provided to enable any person skilled in the art to practice the various aspects described herein. Various modifications to these aspects will be readily apparent to those skilled in the art, and the generic principles defined herein may be applied to other aspects. Thus, the claims are not intended to be limited to the aspects shown herein, but is to be accorded the full scope consistent with the language claims, wherein reference to an element in the singular is not intended to mean "one and only one" unless specifically so stated, but rather "one or more." The word "exemplary" is used herein to mean "serving as an example, instance, or illustration." Any aspect described herein as "exemplary" is not necessarily to be construed as preferred or advantageous over other aspects. Unless specifically stated otherwise, the term "some" refers to one or more. Combinations such as "at least one of A, B, or C," "one or more of A, B, or C," "at least one of A, B, and C," "one or more of A, B, and C," and "A, B, C, or any combination thereof" include any combination of A, B, and/or C, and may include multiples of A, multiples of B, or multiples of C. Specifically, combinations such as "at least one of A, B, or C," "one or more of A, B, or C," "at least one of A, B, and C," "one or more of A, B, and C," and "A, B, C, or any combination thereof" may be A only, B only, C only, A and B, A and C, B and C, or A and B and C, where any such combinations may contain one or more member or members of A, B, or C. All structural and functional equivalents to the elements of the various aspects described throughout this disclosure that are known or later come to be known to those of ordinary skill in the art are expressly incorporated herein by reference and are intended to be encompassed by the claims. Moreover, nothing disclosed herein is intended to be dedicated to the public regardless of whether such disclosure is explicitly recited in the claims. The words "module," "mechanism," "element," "device," and the like may not be a substitute for the word "means." As such, no claim element is to be construed as a means plus function unless the element is expressly recited using the phrase "means for."

What is claimed is:

1. A method of wireless communication at a user equipment (UE), comprising:
    selecting a first synchronization signal burst set (SSBS) occurrence during which to perform a loop tracking task and a radio link management (RLM) task during an OFF duration of a connected-mode discontinuous reception (CDRX) cycle;
    determining whether the UE can perform a third task associated with at least a frequency range during the first SSBS occurrence; and
    performing the third task associated with the at least a frequency range during the first S SB S occurrence.

2. The method of claim 1, wherein the at least a frequency range includes a sub-6GHz frequency range (FR1).

3. The method of claim 2, further comprising selecting a second SSBS occurrence during which to perform a fourth task.

4. The method of claim 1, wherein the third task is one of a measurement task or a search task.

5. The method of claim 1, wherein the at least a frequency range includes a millimeter wave frequency range (FR2), and further comprising:
    performing a measurement associated with a serving beam;
    enabling a beam refinement mode when the measurement satisfies a measurement threshold; and
    disabling the beam refinement mode when the measurement does not satisfy the measurement threshold.

6. The method of claim 5, further comprising determining that the UE can perform the third task during the first SSBS occurrence when the beam refinement mode is disabled.

7. The method of claim 5, wherein the serving beam is transmitted on a widest frequency range beam serving the UE.

8. The method of claim 1, wherein the first SSBS occurrence is received during a first time frame corresponding to a start of an ON duration of the CDRX cycle, and wherein a second SSBS occurrence is received at a first SSBS occurrence after the start of the ON duration.

9. The method of claim 8, further comprising performing a search task during the second SSBS occurrence.

10. The method of claim 8, further comprising:
    performing the loop tracking task and the RLM task during the first SSBS occurrence after a determination that the UE is unable to perform the third task during the first SSBS occurrence;
    performing a search task during the second SSBS occurrence; and
    performing a measurement task during a third SSBS occurrence received after the second SSBS occurrence.

11. An apparatus for wireless communication at a user equipment (UE), comprising:
    means for selecting a first synchronization signal burst set (SSBS) occurrence during which to perform a loop tracking task and a radio link management (RLM) task during an OFF duration of a connected-mode discontinuous reception (CDRX) cycle;
    means for determining whether the UE can perform a third task associated with at least a frequency range during the first SSBS occurrence; and
    means for performing the third task associated with the at least a frequency range during the first SSBS occurrence.

12. The apparatus of claim 11, wherein the at least a frequency range includes a sub-6GHz frequency range (FR1), and further comprising means for selecting a second SSBS occurrence during which to perform a fourth task.

13. The apparatus of claim 11, wherein the third task is one of a measurement task or a search task.

14. The apparatus of claim 11, wherein the at least a frequency range includes a millimeter wave frequency range (FR2), and further comprising:
    means for performing a measurement associated with a serving beam;
    means for enabling a beam refinement mode when the measurement satisfies a measurement threshold; and
    means for disabling the beam refinement mode when the measurement does not satisfy the measurement threshold.

15. The apparatus of claim 14, further comprising means for determining that the UE can perform the third task during the first SSBS occurrence when the beam refinement mode is disabled.

16. The apparatus of claim 11, wherein the first SSBS occurrence is received during a first time frame corresponding to a start of an ON duration of the CDRX cycle, and wherein a second SSBS occurrence is received at a first SSBS occurrence after the start of the ON duration.

17. The apparatus of claim 16, further comprising means for performing a search task during the second SSBS occurrence.

18. The apparatus of claim 16, further comprising:
    means for performing the loop tracking task and the RLM task during the first SSBS occurrence after a determination that the UE is unable to perform the third task during the first SSBS occurrence;
    means for performing a search task during the second SSBS occurrence; and
    means for performing a measurement task during a third SSBS occurrence received after the second SSBS occurrence.

19. A method of wireless communication at a user equipment (UE), comprising:
    determining a first synchronization signal burst set (SSBS) occurrence that is received during a time frame corresponding to a start of an ON duration of a connected-mode discontinuous reception (CDRX) cycle;
    determining whether the first SSBS occurrence is a shareable SSBS based on whether the UE can perform at least a measurement task and a loop tracking task during the first SSBS occurrence;
    performing the measurement task during the first SSBS occurrence when the first SSBS occurrence is the shareable SSBS; and
    performing the measurement task during a second SSBS occurrence when the first SSBS occurrence is a non-shareable SSBS, the second SSBS occurrence being different than the first SSBS occurrence.

20. The method of claim 19, further comprising:
    performing the loop tracking task during the first SSBS occurrence when the first SSBS occurrence is the shareable SSBS, and wherein the first SSBS occurrence is a last SSBS occurrence received before the start of the ON duration of the CDRX cycle.

21. The method of claim 19, further comprising:
performing the loop tracking task during the first SSBS occurrence when the first SSBS occurrence is the non-shareable SSBS, the first SSBS occurrence being a last SSBS occurrence received before the start of the ON duration of the CDRX cycle, and
wherein the second SSBS occurrence is received after the start of the ON duration of the CDRX cycle.

22. The method of claim 19, further comprising:
determining whether the UE can perform the loop tracking task during a tracking reference signal (TRS) occurrence based on whether the TRS occurrence is received between an SSBS occurrence received during an OFF duration of a previous CDRX cycle and the start of the ON duration of the CDRX cycle; and
performing the loop tracking task during the TRS occurrence when the TRS occurrence is usable.

23. The method of claim 22, wherein the first SSBS occurrence is the shareable SSBS and is received after the TRS occurrence.

24. The method of claim 22, wherein the second SSBS occurrence is the non-shareable SSBS and is received after the TRS occurrence.

25. An apparatus for wireless communication at a user equipment (UE), comprising:
means for determining a first synchronization signal burst set (SSBS) occurrence that is received during a time frame corresponding to a start of an ON duration of a connected-mode discontinuous reception (CDRX) cycle;
means for determining whether the first SSBS occurrence is a shareable SSBS based on whether the UE can perform at least a measurement task and a loop tracking task during the first SSBS occurrence;
means for performing the measurement task during the first SSBS occurrence when the first SSBS occurrence is the shareable SSBS; and
means for performing the measurement task during a second SSBS occurrence when the first SSBS occurrence is a non-shareable SSBS, the second SSBS occurrence being different than the first SSBS occurrence.

26. The apparatus of claim 25, further comprising:
means for performing the loop tracking task during the first SSBS occurrence when the first SSBS occurrence is the shareable SSBS, and
wherein the first SSBS occurrence is a last SSBS occurrence received before the start of the ON duration of the CDRX cycle.

27. The apparatus of claim 25, further comprising:
means for performing the loop tracking task during the first SSBS occurrence when the first SSBS occurrence is the non-shareable SSBS, the first SSBS occurrence being a last SSBS occurrence received before the start of the ON duration of the CDRX cycle, and
wherein the second SSBS occurrence is received after the start of the ON duration of the CDRX cycle.

28. The apparatus of claim 25, further comprising:
means for determining whether the UE can perform the loop tracking task during a tracking reference signal (TRS) occurrence based on whether the TRS occurrence is received between an SSBS occurrence received during an OFF duration of a previous CDRX cycle and the start of the ON duration of the CDRX cycle; and
means for performing the loop tracking task during the TRS occurrence when the TRS occurrence is usable.

29. The apparatus of claim 28, wherein the first SSBS occurrence is the shareable SSBS and is received after the TRS occurrence.

30. The apparatus of claim 28, wherein the second SSBS occurrence is the non-shareable SSBS and is received after the TRS occurrence.

31. An apparatus for wireless communication at a user equipment (UE), comprising:
memory; and
a processor coupled to the memory, the processor configured to:
select a first synchronization signal burst set (SSBS) occurrence during which to perform a loop tracking task and a radio link management (RLM) task during an OFF duration of a connected-mode discontinuous reception (CDRX) cycle;
determine whether the UE can perform a third task associated with at least a frequency range during the first SSBS occurrence; and
perform the third task associated with the at least a frequency range during the first SSBS occurrence.

32. The apparatus of claim 31, wherein the third task is one of a measurement task or a search task.

* * * * *